Oct. 20, 1925.                                                 1,557,891
                        W. C. STEVENS
                    TIRE BUILDING MACHINE
                    Filed Oct. 1, 1918        19 Sheets-Sheet 1
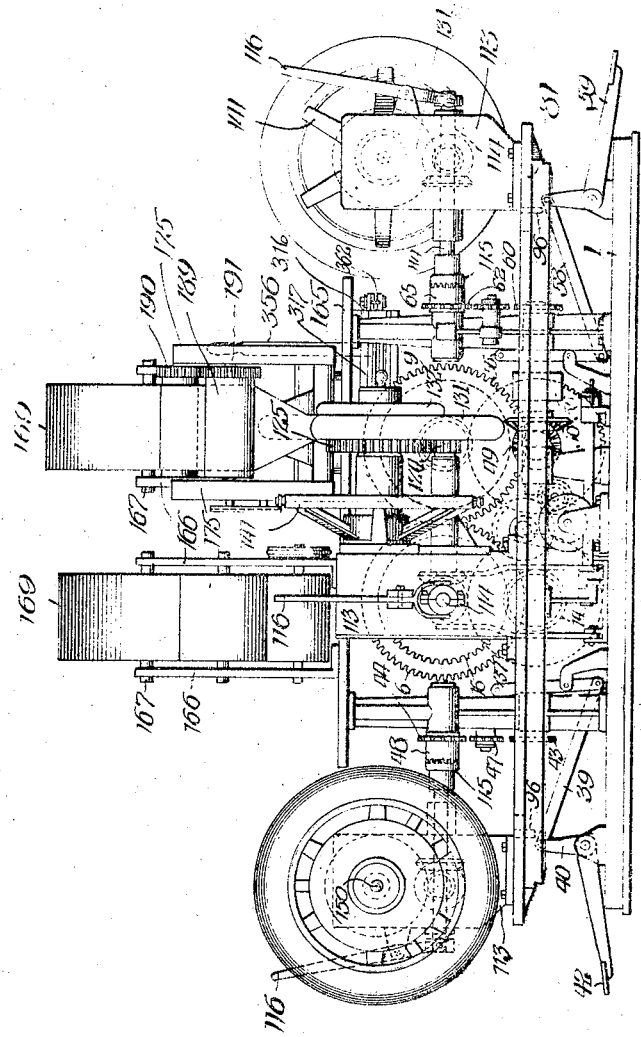

Oct. 20, 1925.
W. C. STEVENS
1,557,891
TIRE BUILDING MACHINE
Filed Oct. 1, 1918
19 Sheets-Sheet 2
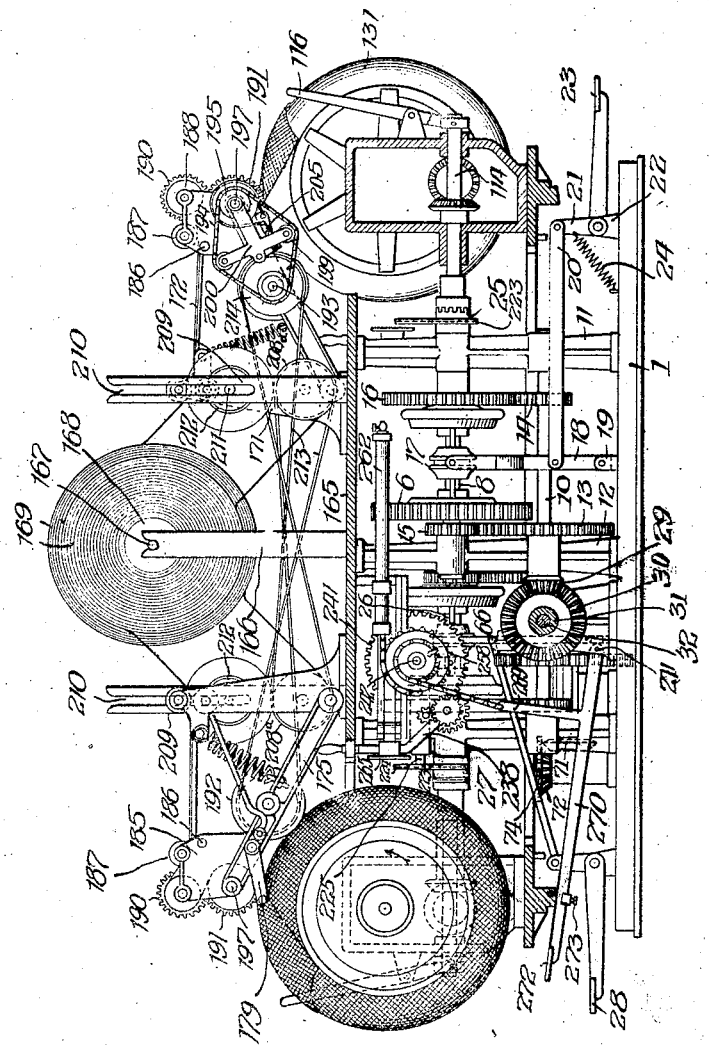
Inventor
William C. Stevens
By G. L. Ely Atty.

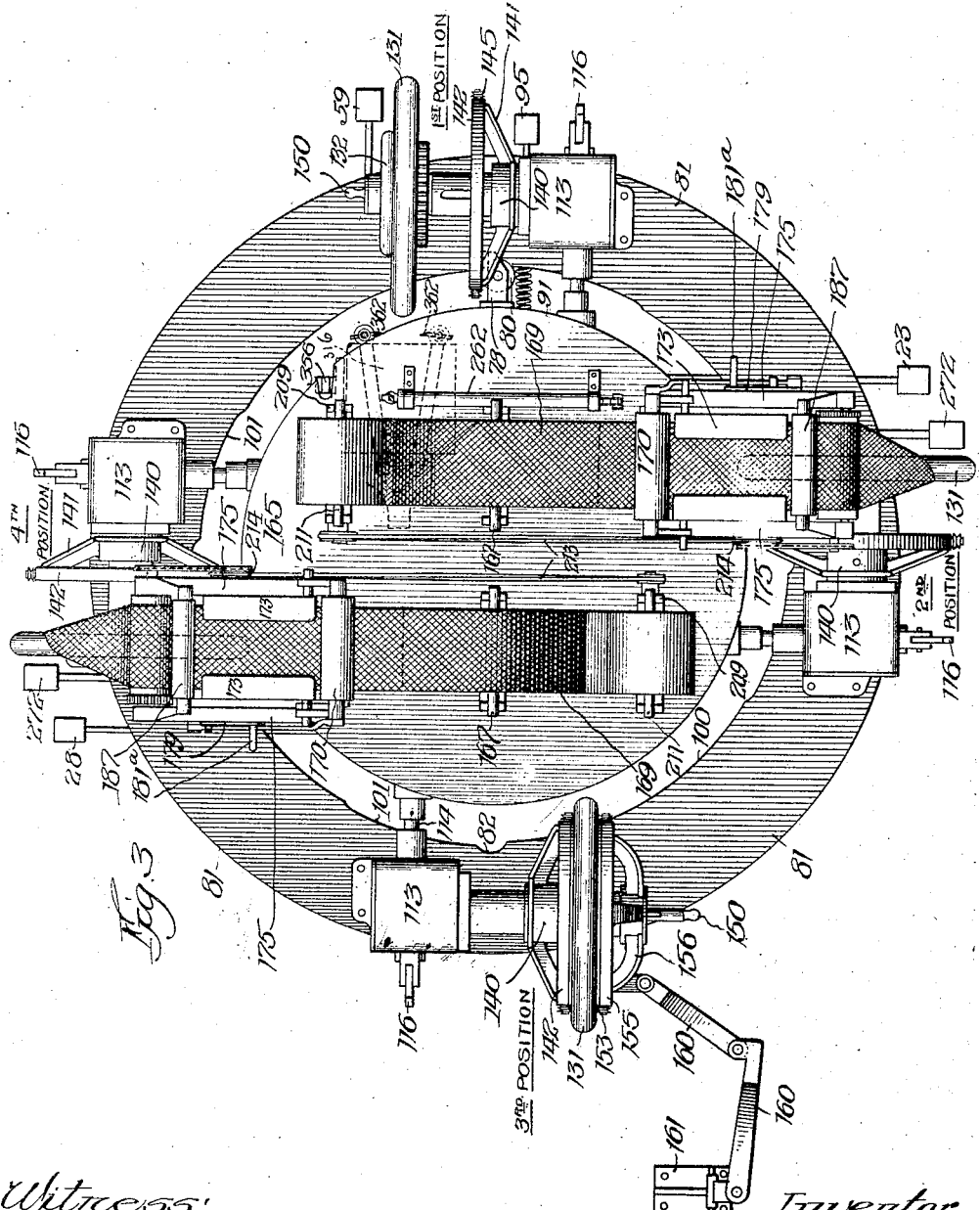

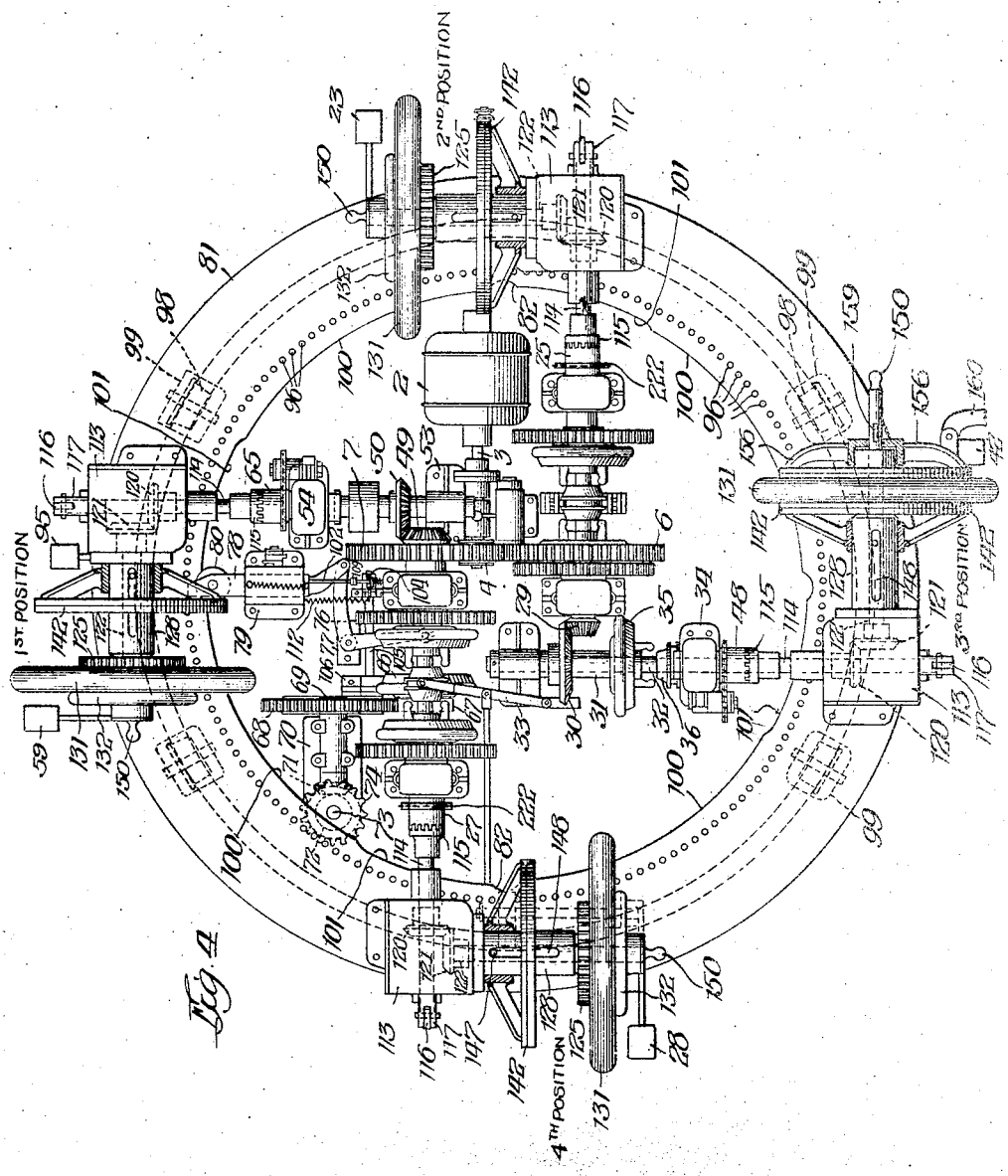

Oct. 20, 1925  
W. C. STEVENS  
TIRE BUILDING MACHINE  
Filed Oct. 1, 1918  
1,557,891  
19 Sheets-Sheet 5
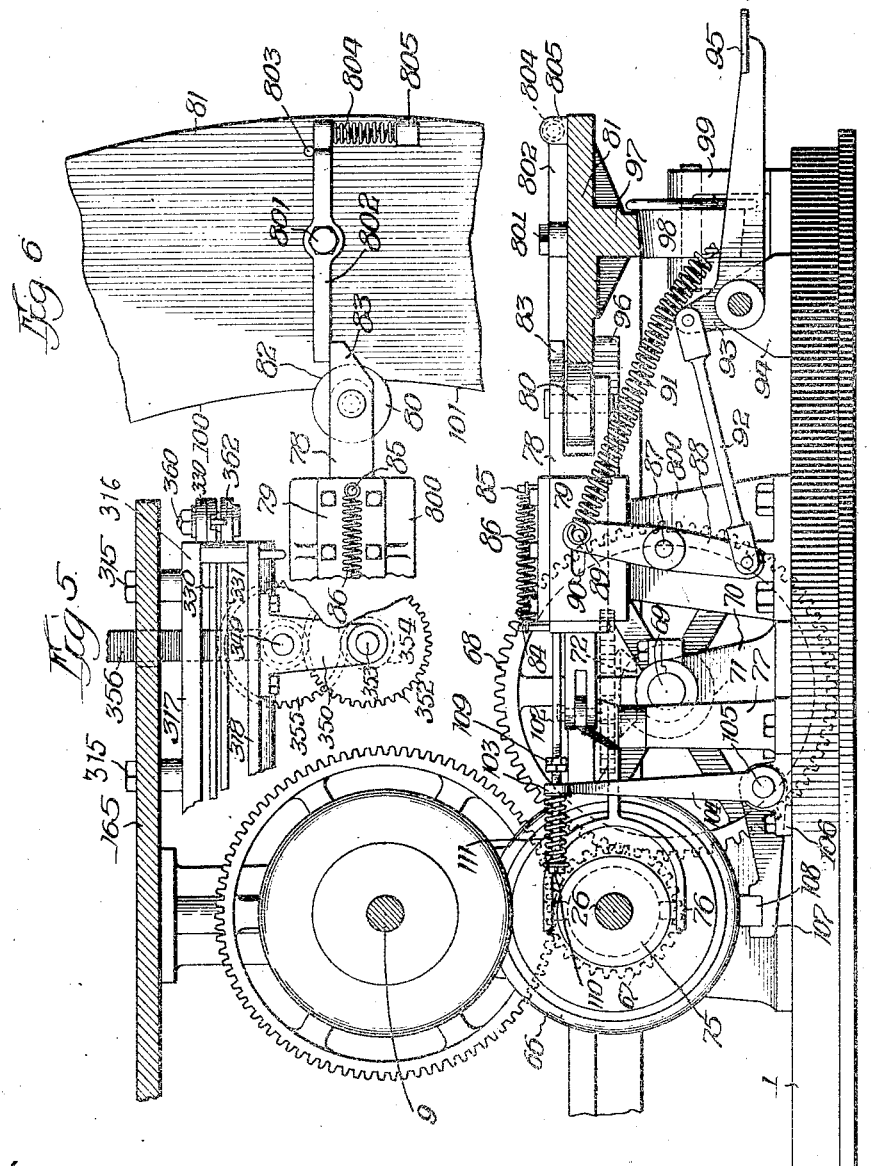

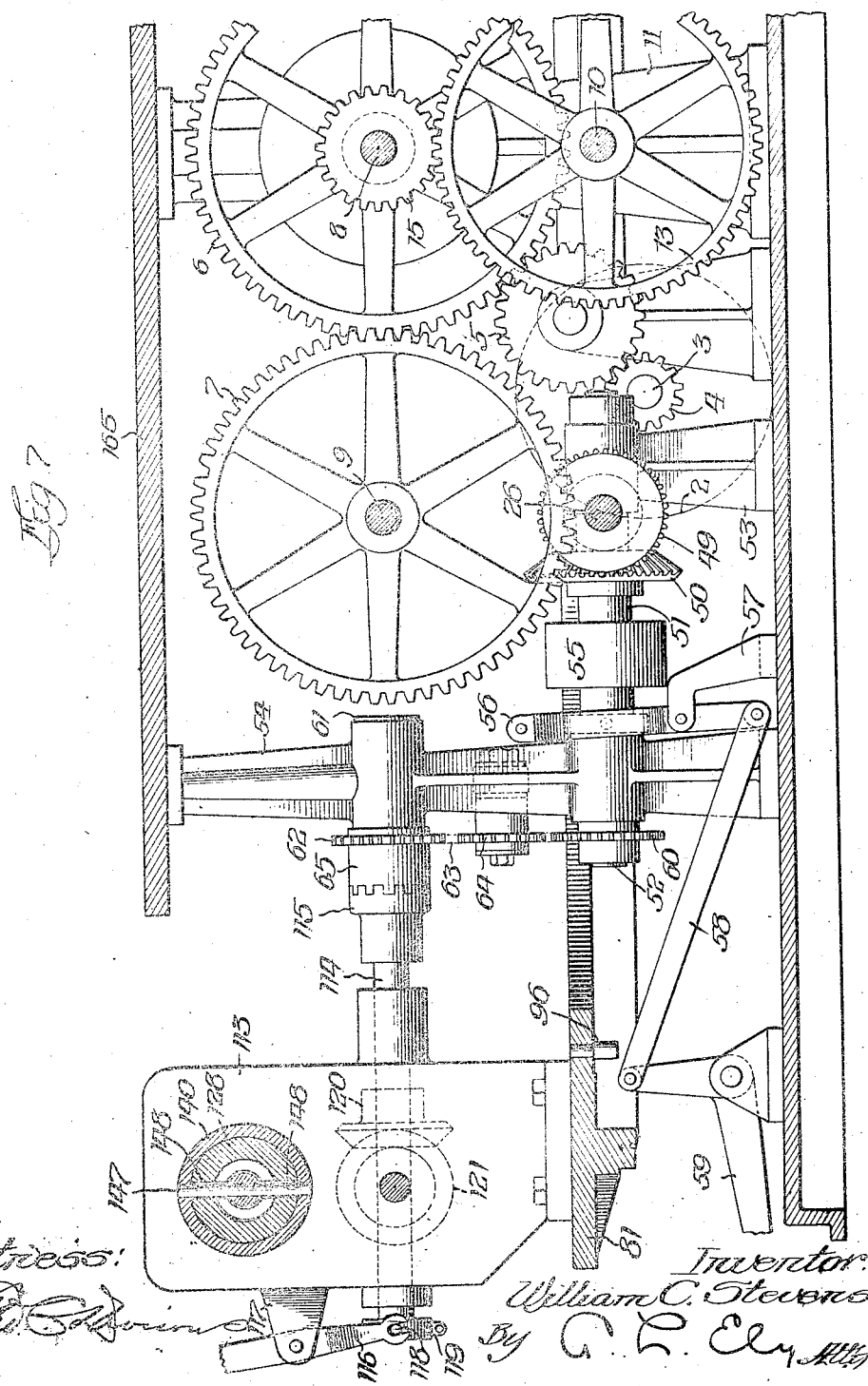

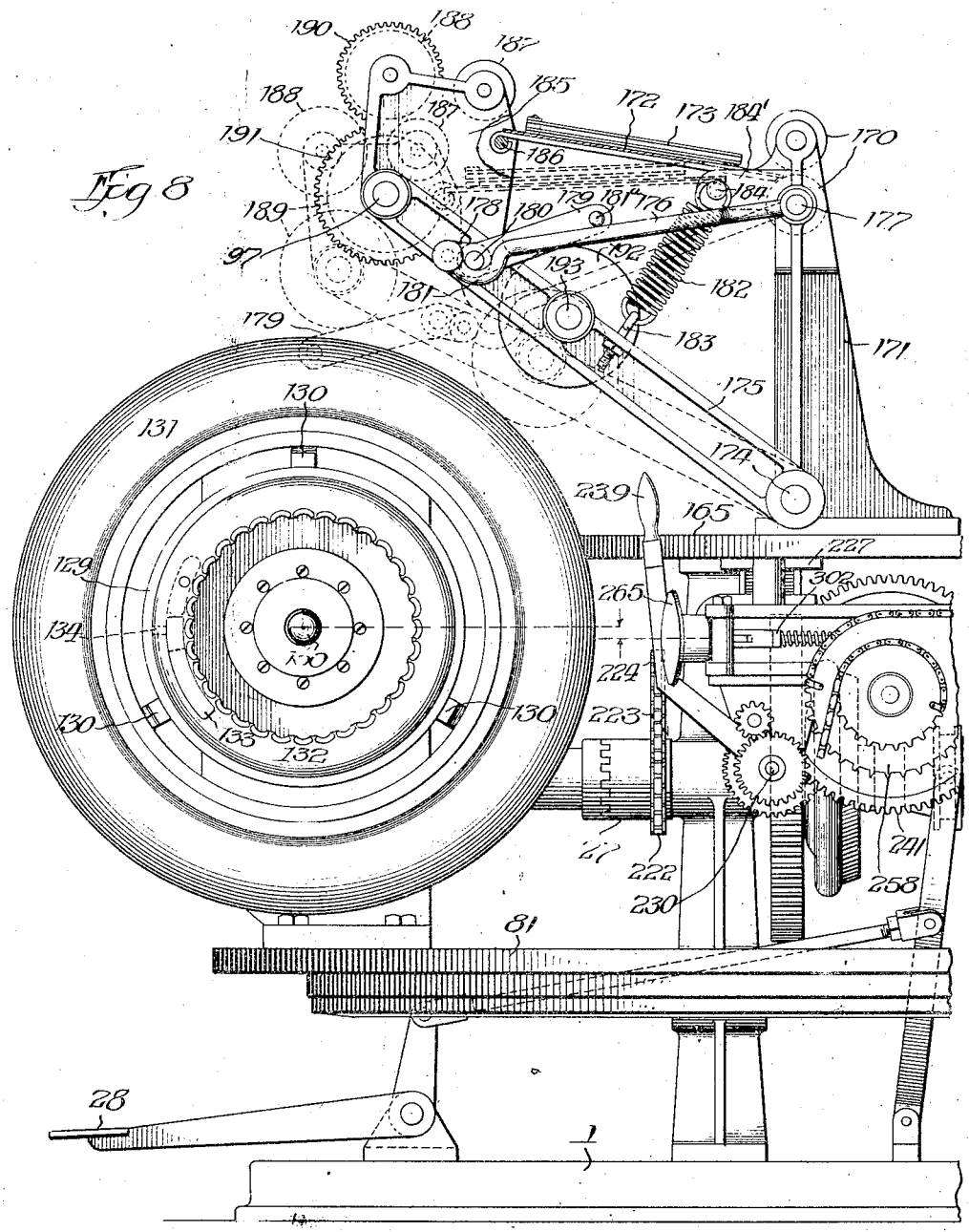

Oct. 20, 1925.  
W. C. STEVENS  
TIRE BUILDING MACHINE  
Filed Oct. 1, 1918    19 Sheets-Sheet 8
1,557,891
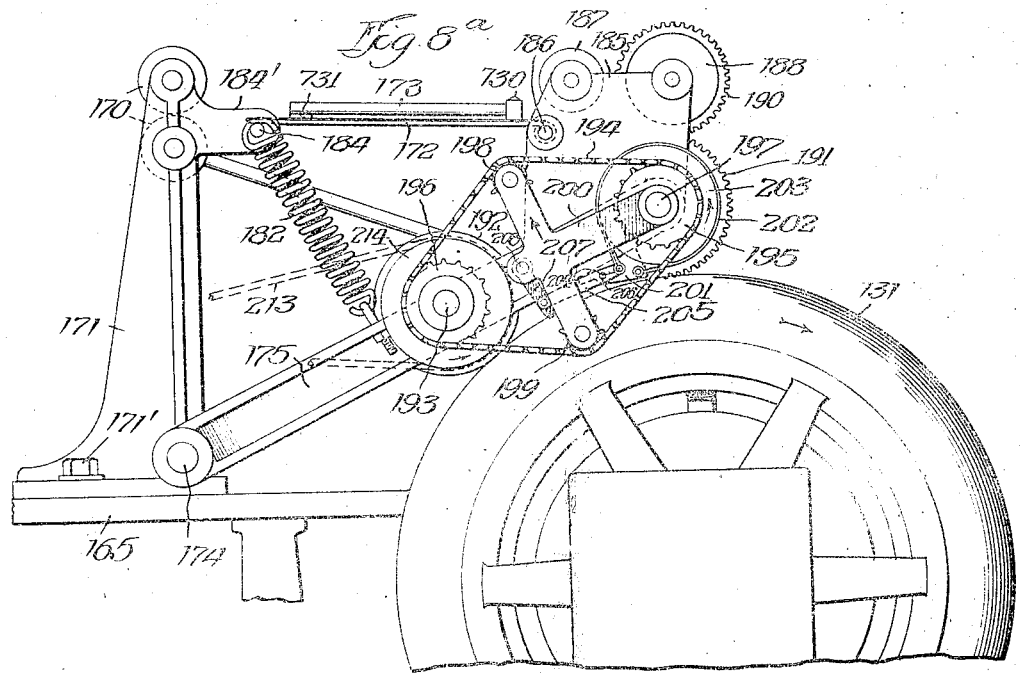
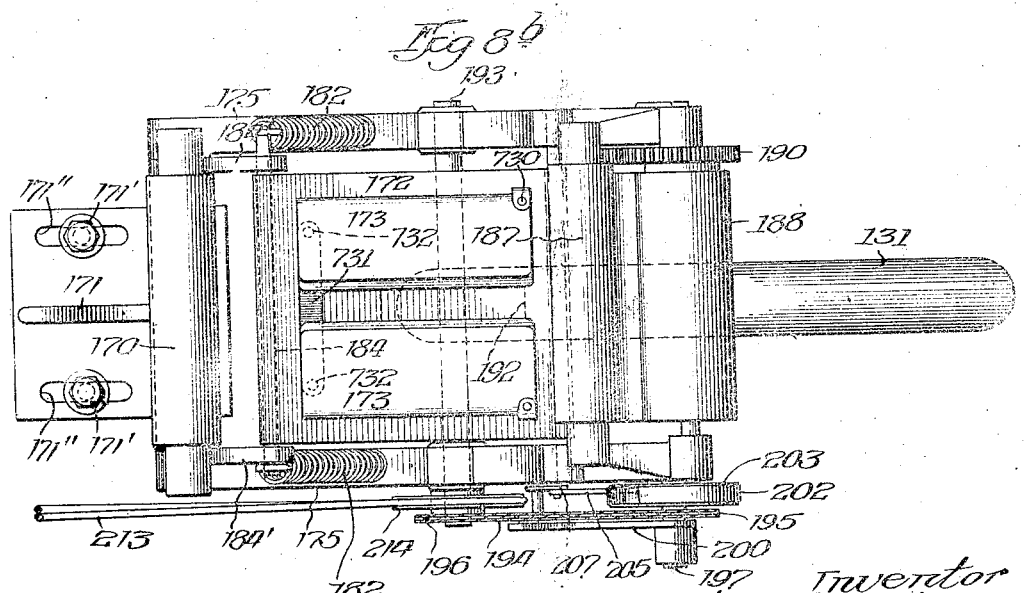
Witness:  
Inventor  
William C. Stevens  
By G. L. Ely  
Atty.

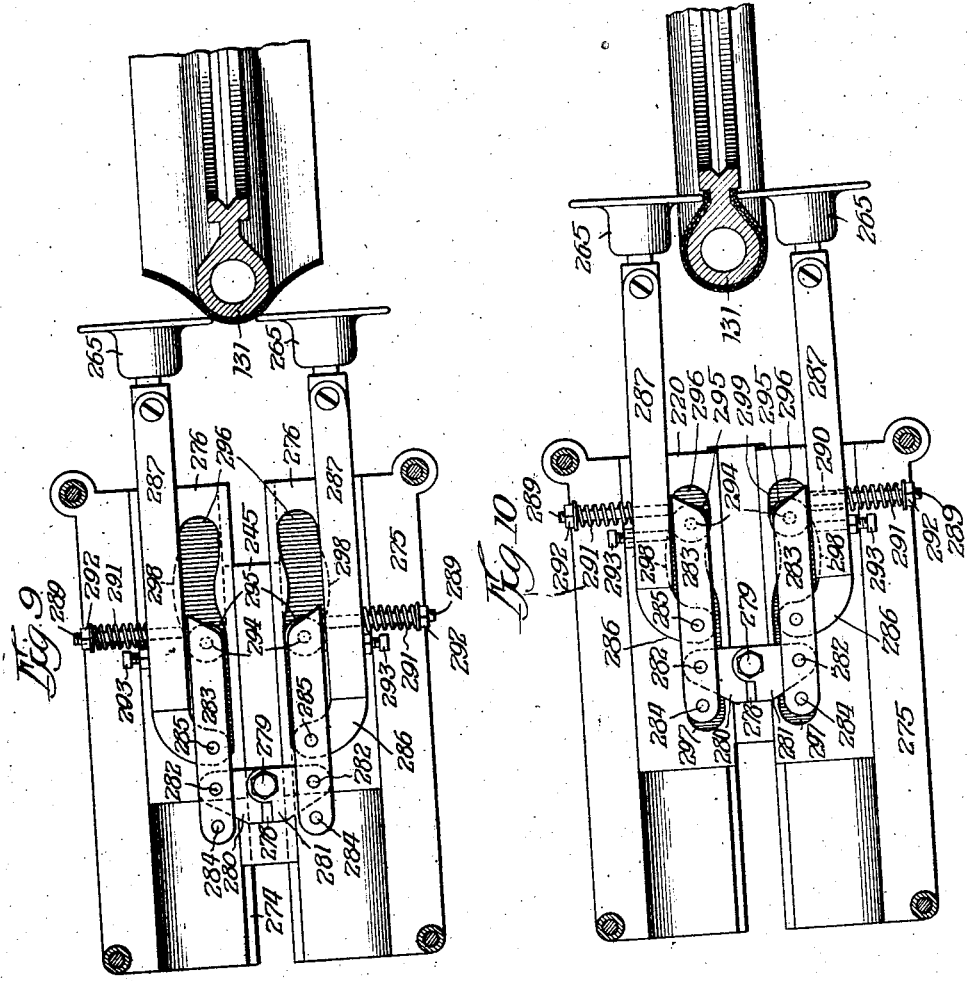

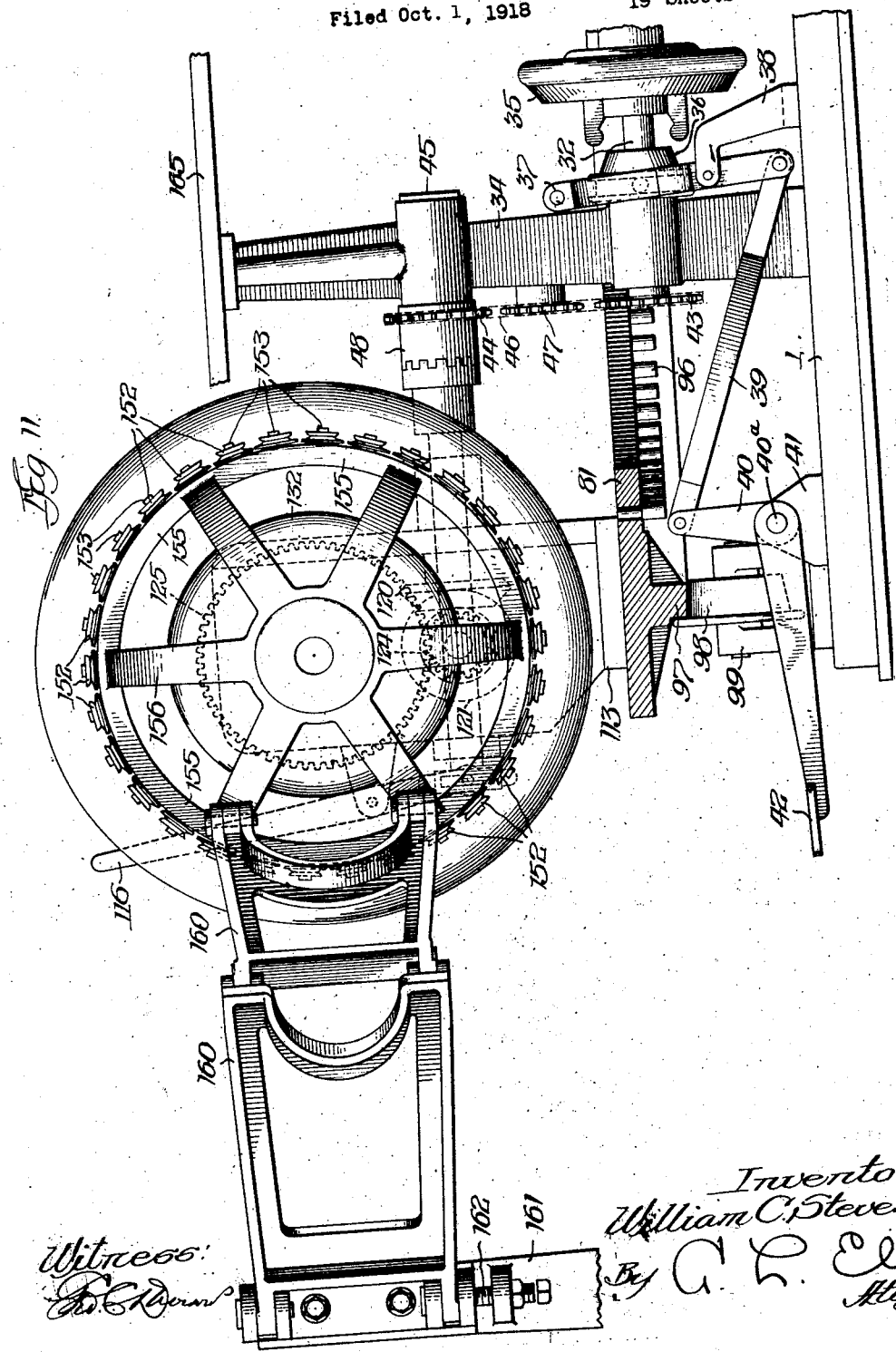

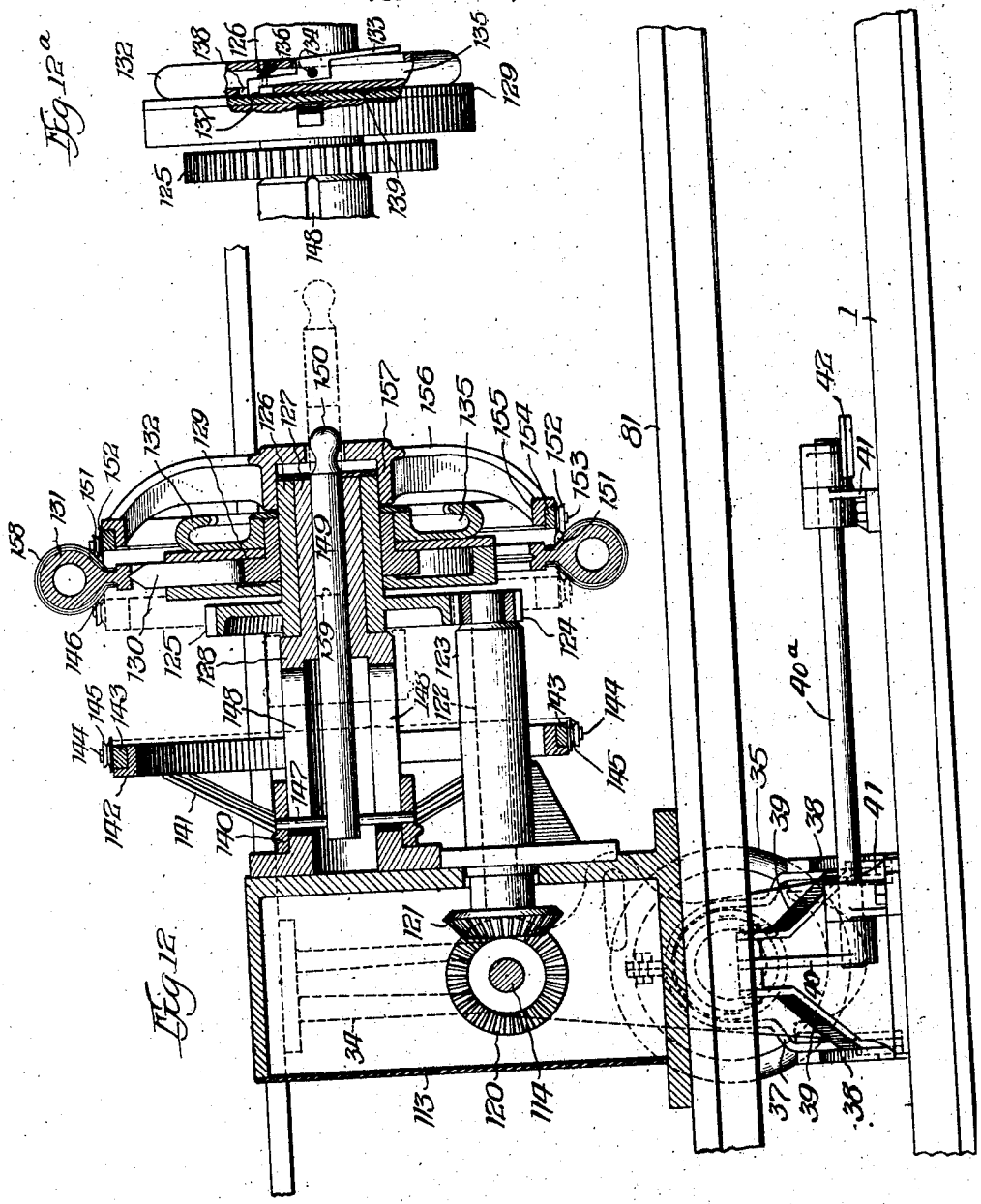

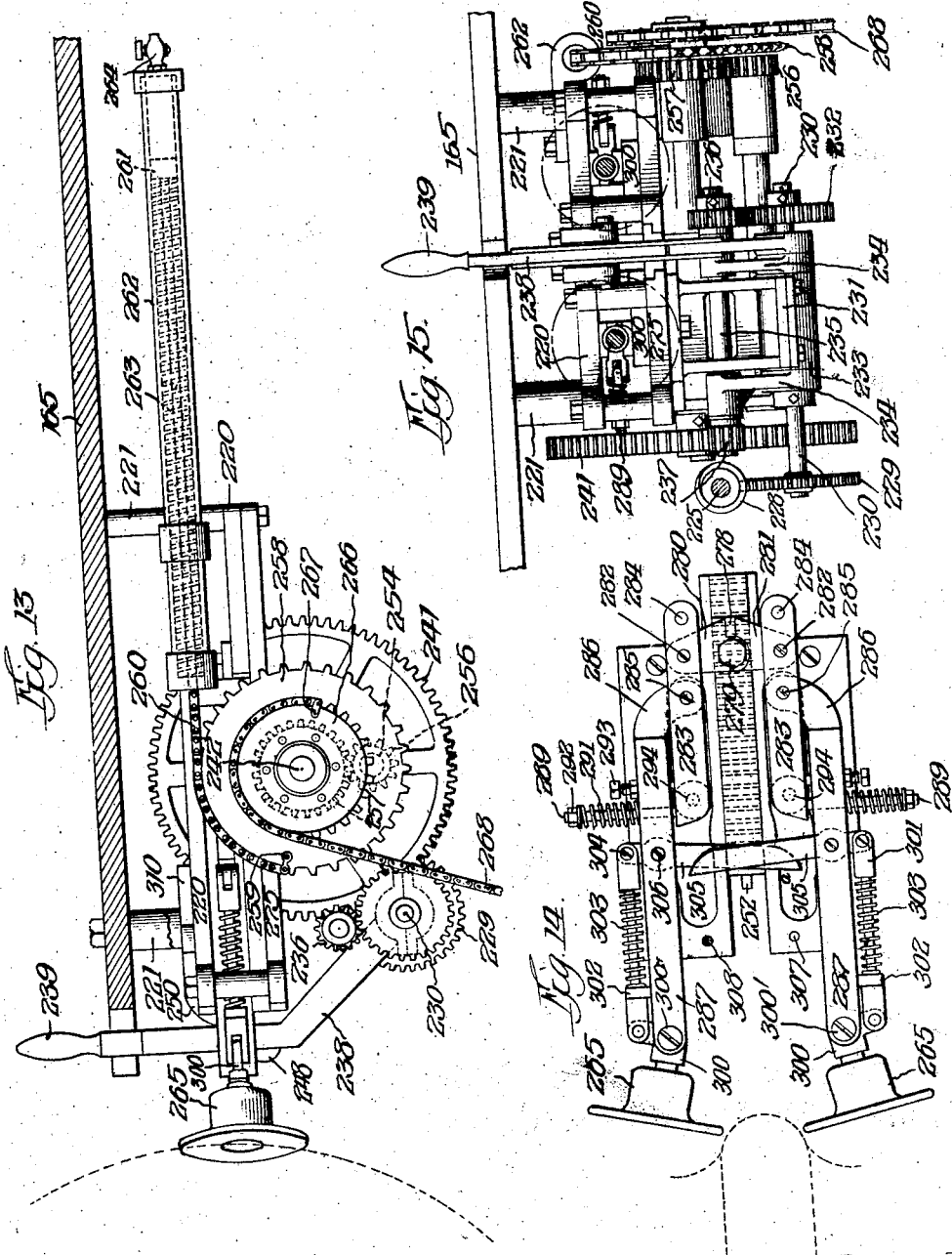

Oct. 20, 1925.
W. C. STEVENS
TIRE BUILDING MACHINE
Filed Oct. 1, 1918
1,557,891
19 Sheets-Sheet 13
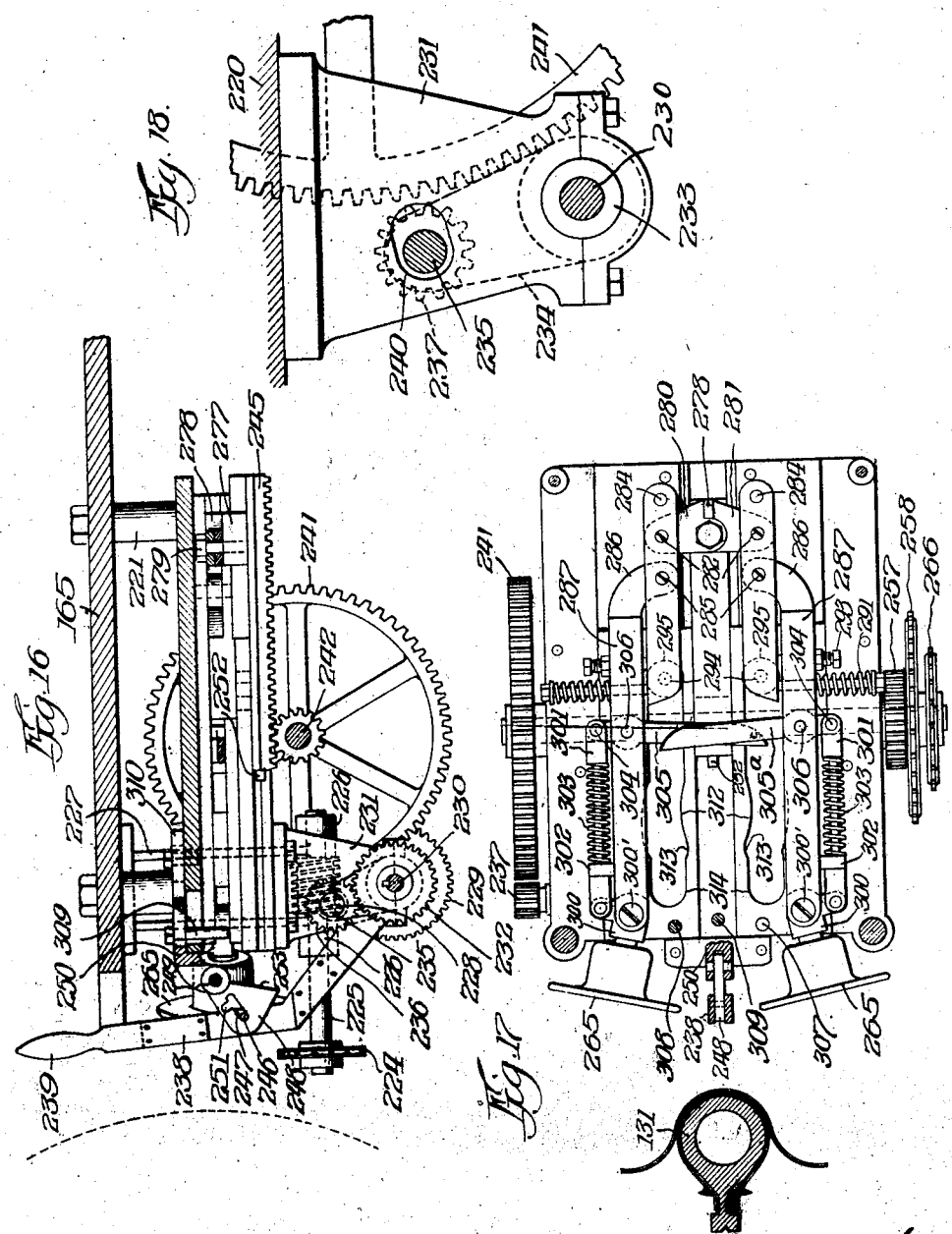

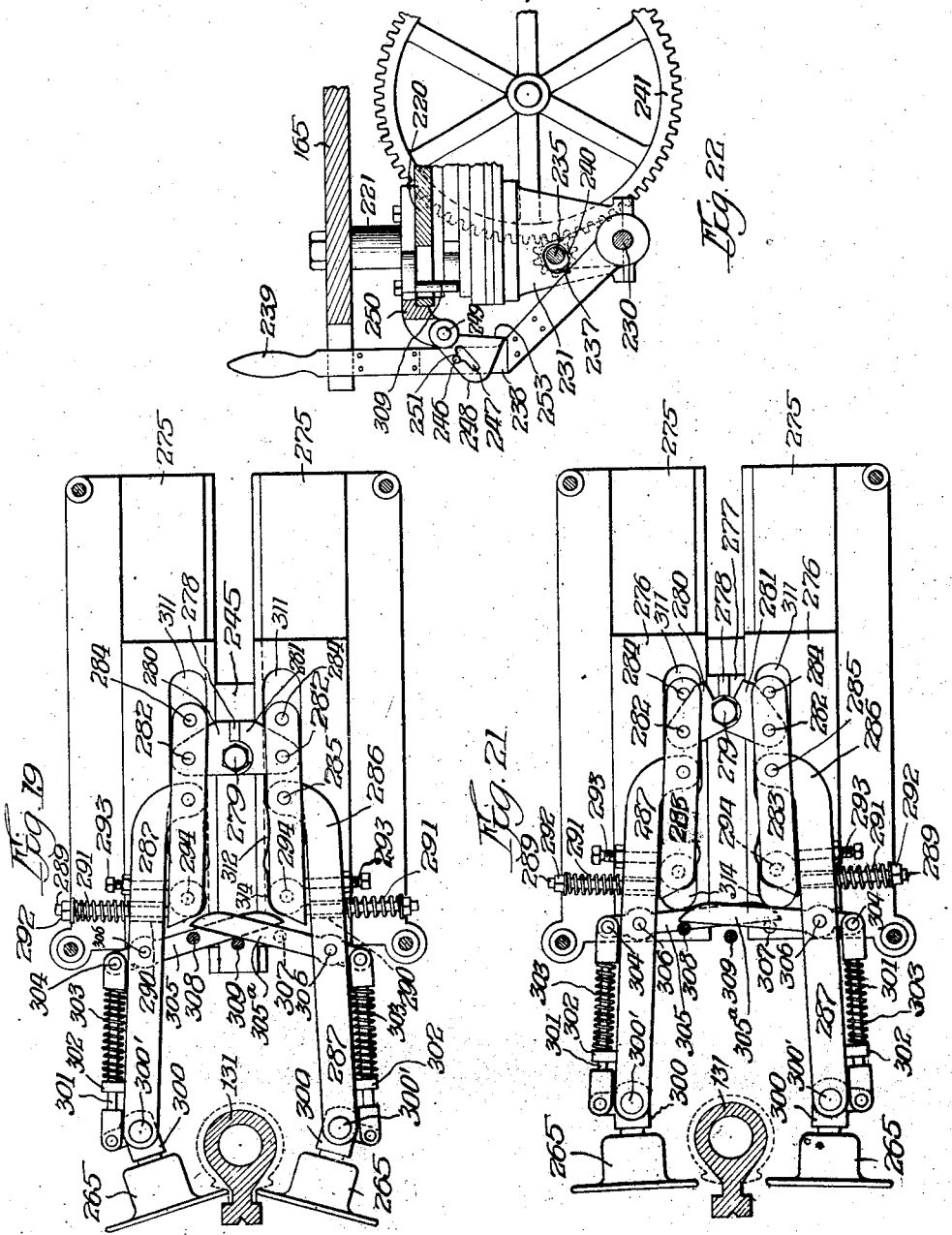

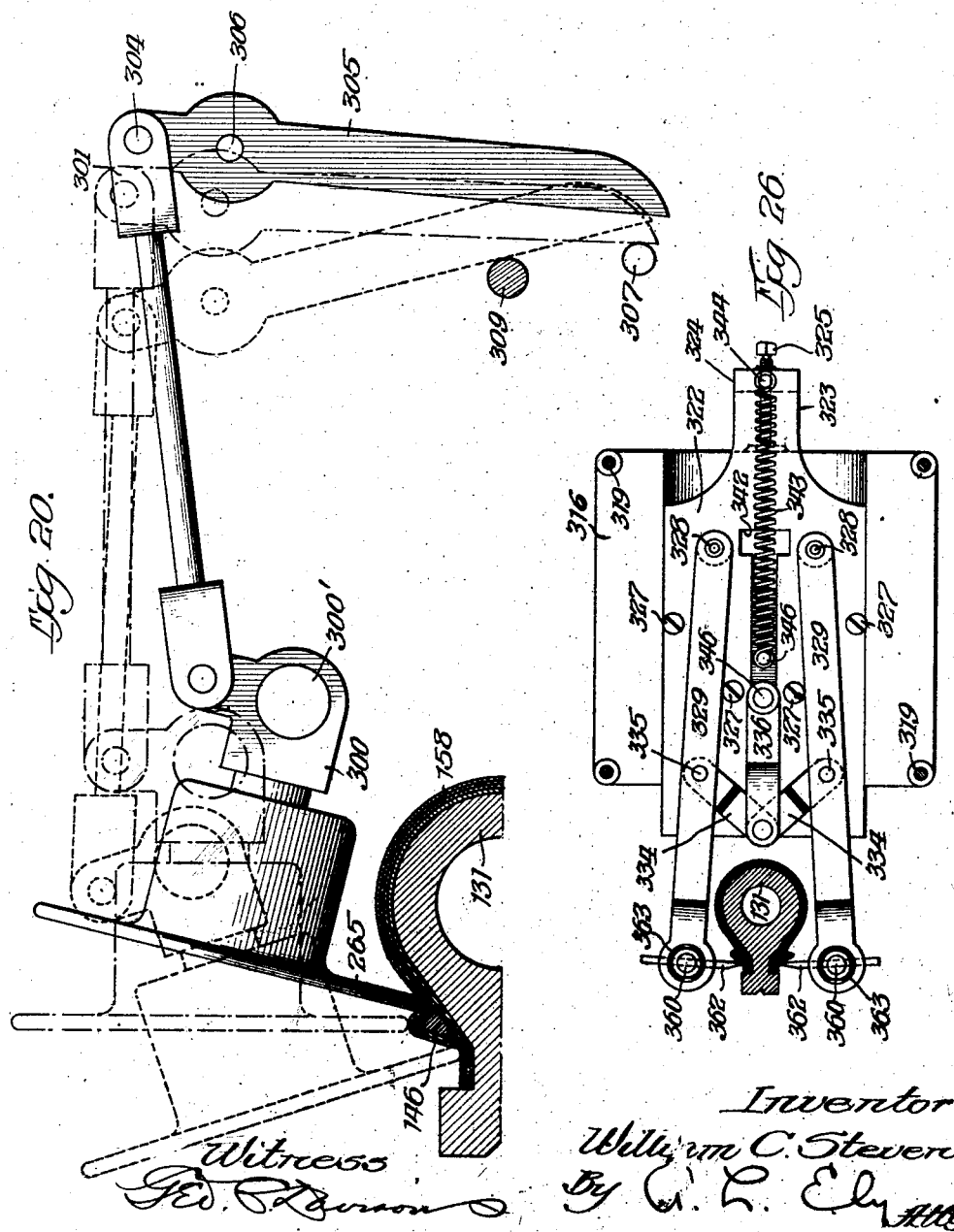

Oct. 20, 1925.
W. C. STEVENS
1,557,891
TIRE BUILDING MACHINE
Filed Oct. 1, 1918
19 Sheets-Sheet 16
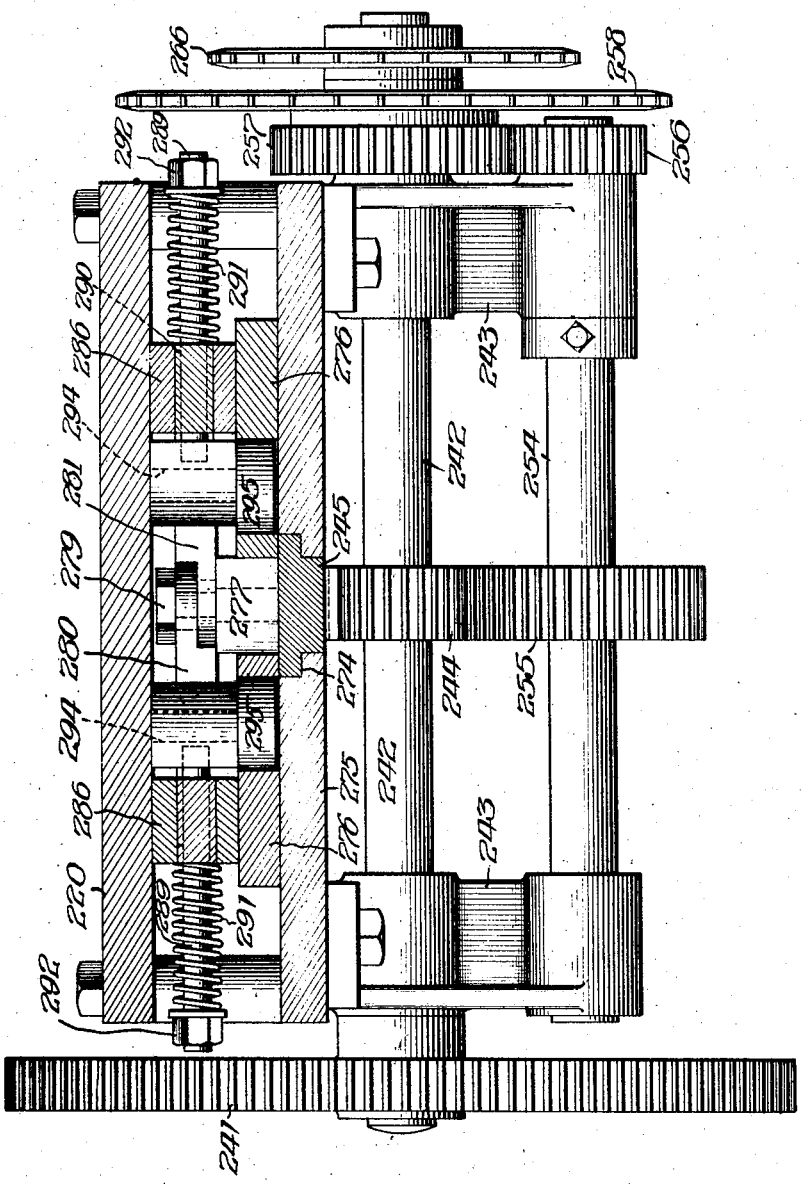

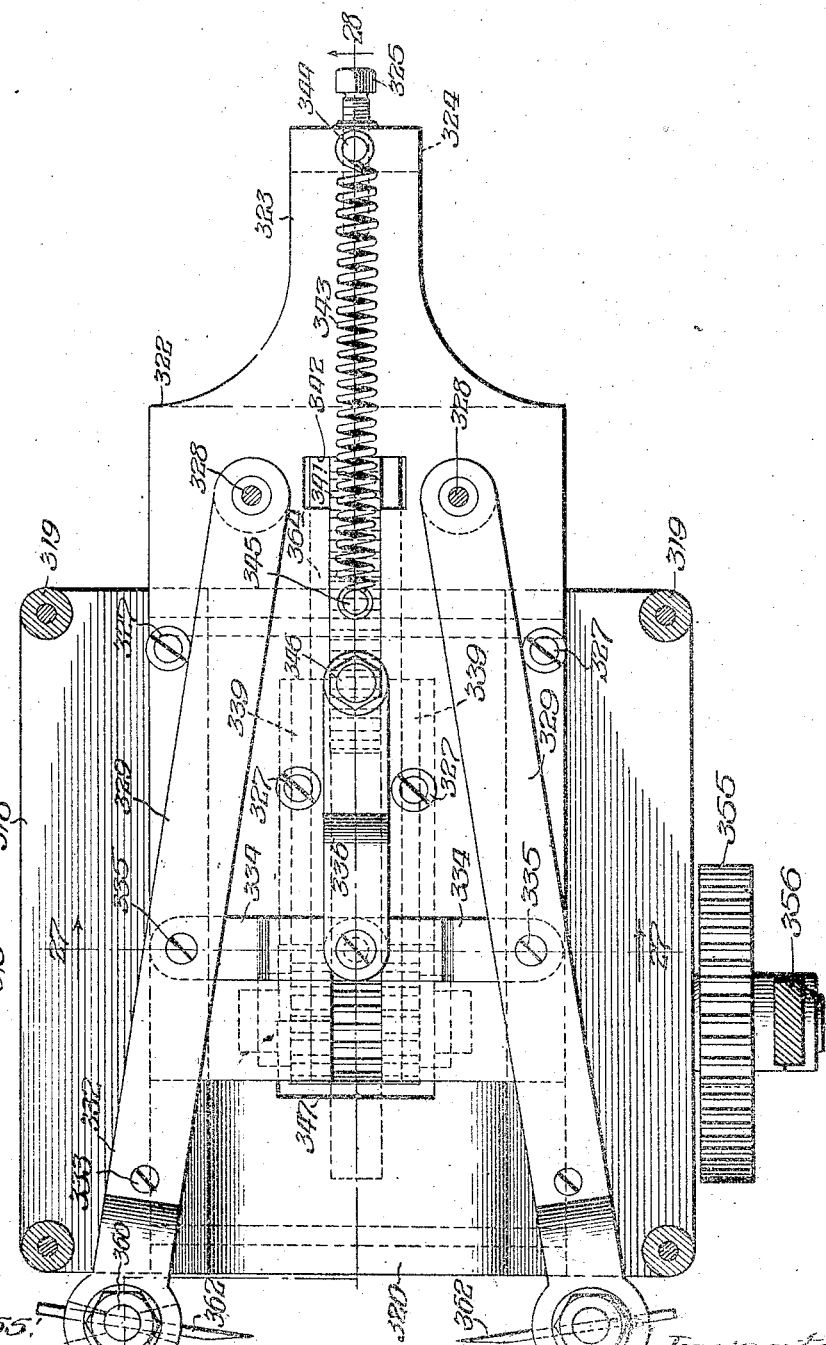

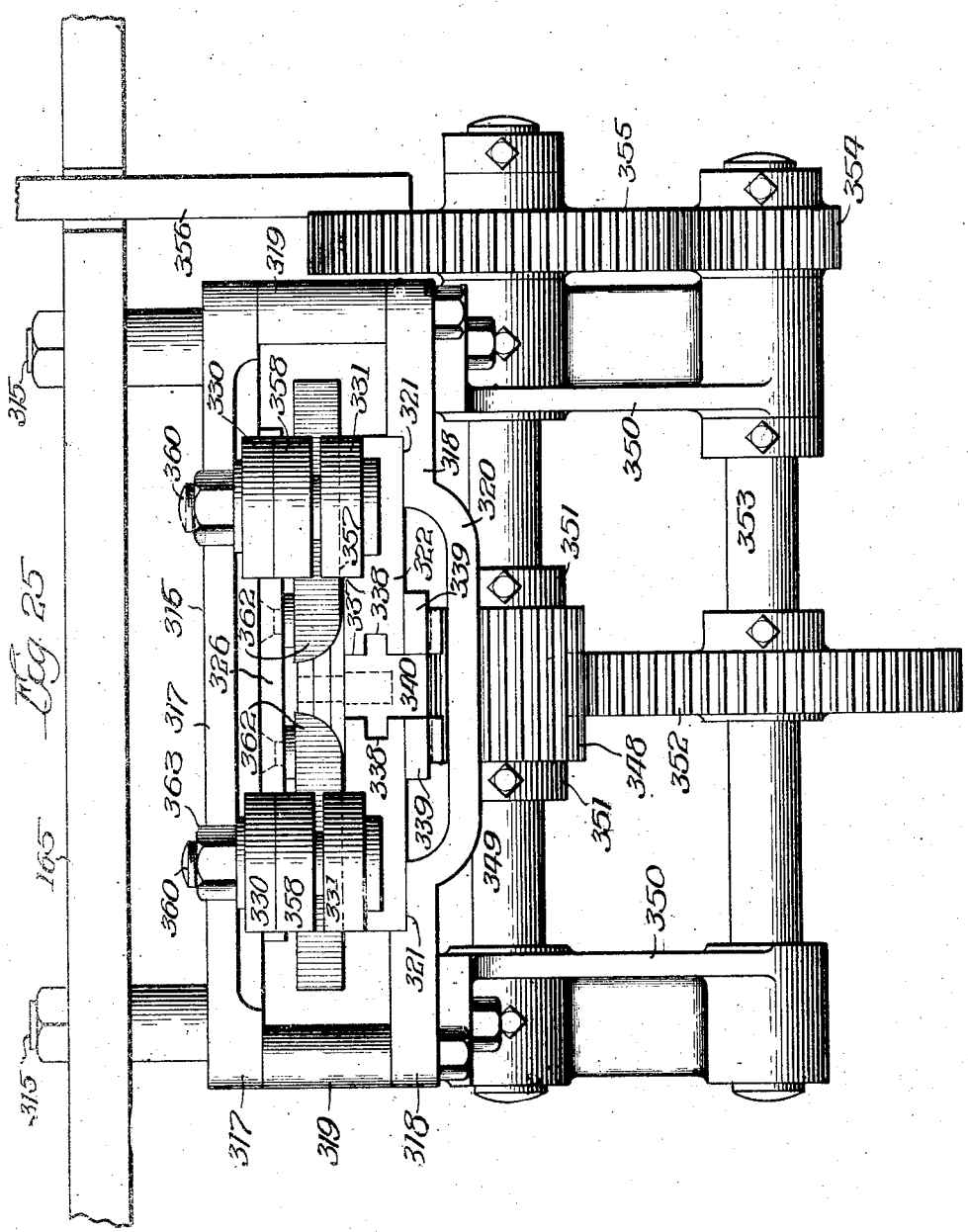

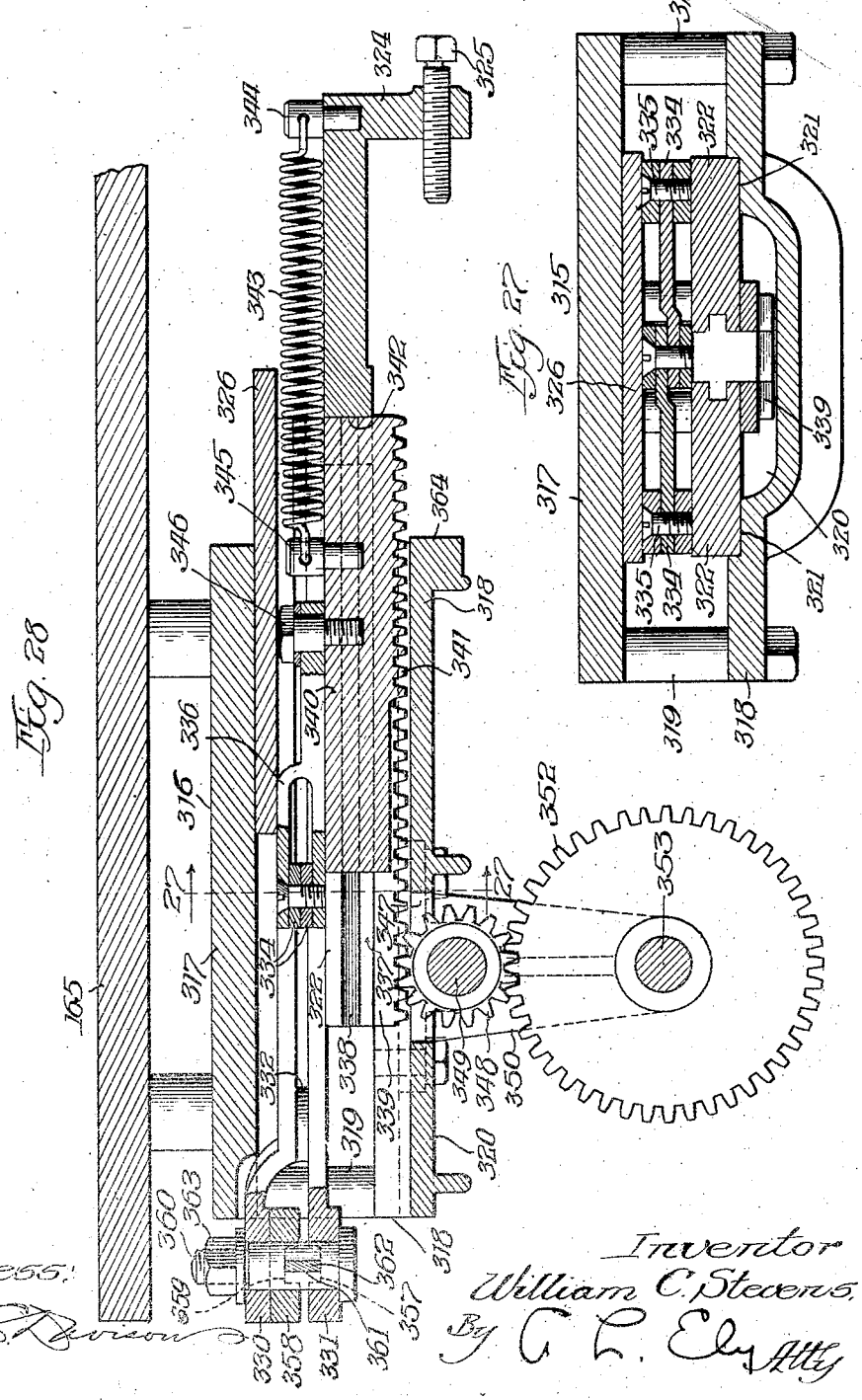

Patented Oct. 20, 1925.

1,557,891

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE-BUILDING MACHINE.

Application filed October 1, 1918. Serial No. 256,429.

*To all whom it may concern:*

Be it known that I, WILLIAM C. STEVENS, a citizen of the United States, residing at Akron, in the county of Summit, State of Ohio, have invented certain new and useful Improvements in Tire-Building Machines, of which the following is a specification.

This invention relates to a new and improved machine for the manufacture of that portion of a pneumatic tire known as the tire carcass, composed of a plurality of layers of fabric which are stretched over an annular core and shaped to the sides thereof by the machine. Numerous machines have been developed for accomplishing the building of the tire, but it is the purpose of the present invention to improve upon the machines in use at this time with a view to rendering the operation of building a tire as nearly automatic as possible, thus eliminating the human factor in the production, making a product which is substantially uniform. It is also a purpose to speed up the production of tires and to enable them to be turned out more rapidly than has been possible with any machine known to me.

Other objects of the invention are to improve the mechanism for advancing the spinning roller over the side of the core, and to cause the spinning roller in its movement over the side of the core to follow the shape of the core with accuracy, and in shaping the fabric over the bead to follow the contour of the bead and conform the fabric about the heel and in the underside thereof. It is also an object to cause the stitchers to automatically return to their positions when the work is finished. A further object is to improve the trimming mechanism so that this operation may be done more rapidly and accurately than heretofore.

It is also a purpose of this invention to so construct a tire building machine that the different operations are carried out at different stations, each of which may be the work of a single operator, so that each operator may become adept in the particular step in tire manufacture, and the work will be performed more rapidly and accurately. The fabric feeding and stretching mechanism is also improved and the bead placing operation has been simplified.

For the sake of rendering further discussion of the machine more easily comprehensible, it will be understood that it comprises a stationary framework on which is mounted the fabric carrying and stretching mechanism, the latter mechanism being designed to co-operate with the cores as they are placed in position, and a turntable on which are mounted a sufficient number of core carrying chucks to enable the several steps in the manufacture of a tire to be carried on simultaneously. There are also provided the proper driving connections for the cores in their several positions and mechanism to revolve the turntable step by step. Each chuck is provided with a portion of the bead placing mechanism while at one point or station is mounted a second bead placing device adapted to be brought into co-operation with each core in turn. Mounted on the stationary framework at opposite points, are two sets of stitching or spinning mechanisms with means for advancing them over the core and at another point is mounted a trimming device. While there are shown four core holding chucks and four stations at which the several operations take place, this number may be increased or diminished within the scope of the invention.

As shown, there are four stations or operations in the manufacture of the tire. At the first station the finished carcass is trimmed and inspected, the core removed and a new core put in its place, at the second station the first plies, or those that go under the bead are applied to the core and stitched in place, at the third station the beads are applied, and at the fourth station the final plies over the bead are put in position and stitched to the core and around the bead.

These and other objects will be apparent to those skilled in the art, and it is understood that changes and modifications may be made without sacrificing any of the benefits of the invention or departing from its scope.

In the drawings accompanying this application there is shown one form which the machine may assume, many of the larger views omitting certain parts for the sake of clearness.

Fig. 1 is a side elevation of the machine looking in the direction of the fabric applying mechanism.

Fig. 2 is a side elevation looking in the direction at right angle to Fig. 1 the stationary table or platform and the turntable being in section.

Fig. 3 is a plan view of the machine.

Fig. 4 is a plan view of the parts of the machine directly below the platform.

Fig. 5 is an elevation of the escapement mechanism for the turntable showing the driving apparatus to move it.

Fig. 6 is a fragmentary plan of the escapement device.

Fig. 7 is a partial elevation showing the driving mechanism for the core in its first positions.

Fig. 8 is an elevation of the core in position to have the fabric placed thereon, showing the fabric stretching mechanism in full lines out of contact with the core and in contact with the core in dotted line position.

Figs. 8ª and 8ᵇ are the side and top views respectively showing the construction of the drive for the stretching mechanism.

Fig. 9 is a plan view of the first stitcher mechanism in position to shape the fabric to the core.

Fig. 10 is a similar view showing the stitchers at the outward limit of their movement.

Fig. 11 is an elevation of the core in bead placing position.

Fig. 12 is a vertical section through the core shaft of Fig. 11.

Fig. 12ª is a cross section of the ratchet construction in the chuck.

Fig. 13 is a side elevation of the stitching mechanism for the later plies, or those which go over the bead.

Fig. 14 is a plan view showing the second set of stitchers at the point of commencement of the stitching operation.

Fig. 15 is a front elevation of Fig. 13 with the stitching rollers or disks removed.

Fig. 16 is a vertical section through the stitching apparatus.

Fig. 17 is a plan view similar to Fig. 14 but with the stitching disks in retracted position.

Fig. 18 is a detail view showing the releasable driving connection for the stitcher.

Fig. 19 is a view similar to Fig. 14 showing the stitchers at the completion of their inward movement after shaping the fabric to the underside of the bead.

Fig. 20 is a fragmentary view of a single stitcher showing the manner in which is obtained the slowing up of the stitcher to go over the top of the bead.

Fig. 21 is a view showing the stitchers swung outwardly preparatory to beginning their return movement.

Fig. 22 is a view similar to the forward part of Fig. 16 showing the driving mechanism coupled together for driving relation.

Fig. 23 is an enlarged cross section through the stitching mechanism.

Fig. 24 is a plan view of the trimming mechanism.

Fig. 25 is a front view of the trimming mechanism.

Fig. 26 is a plan view of the trimming mechanism showing the knives in position to trim the finished carcass.

Fig. 27 is a section on the line 27—27 of Figs. 24 and 28.

Fig. 28 is a section on the line 28—28 of Fig. 24.

For the purpose of clearness the machine will be described in its several parts as far as practical, including the base and several driving mechanisms, the turn table and core supports, the bead placing devices, the fabric stretching and applying devices, the two stitcher mechanisms and the trimming mechanism.

The base and driving mechanism.

1 represents the circular base or support on which are mounted the motor and the various brackets and supports for the moving parts of the machine. The motor is indicated at 2, the motor shaft 3 carrying the pinion 4 in mesh with an idler 5 which in turn drives a gear wheel 6, which is one of a pair of main driving gears, the other being shown at 7 in mesh with the gear 6 and of the same size, (Fig. 7). The gears 6 and 7 are the principal driving gears of the machine and from them is derived motion for the operating parts of the machine. The gear 6 is loosely mounted on the shaft 8 and the gear 7 loosely mounted on the shaft 9. In machines of this general type it is customary to provide means for operating the chuck carrying the core at a fast and slow speed, the latter being used when the fabric is being drawn on the core under tension, and the former used when the fabric is being spun down to the sides of the core. Any preferred type of driving arrangement may be used for obtaining the two speeds but I prefer the use shown herein. The train of gearing for both core chucks in the second and fourth positions, in which the application and shaping of the fabric occur, are the same and one only will be described for which reference will be had to Figs. 2 and 7 in which is shown the drive for the core in the second position.

Located under the shaft 8 is a jack shaft 10 being mounted in brackets 11 and 12. This shaft has secured to it a large pinion 13 and a small pinion 14, the former being in mesh with a pinion 15 driven by the gear 6 and the latter being in mesh with a gear 16 loosely mounted on the shaft 8. The shaft 8 may be interlocked to be driven by the gear 6 or the gear 16 at fast and slow speeds respectively by moving a shiftable clutch operating cone 17 mounted midway between the two gears, and normally standing in neutral or central positions, but arranged to be thrown in either direction by a lever 18 pivoted to a bracket 19 on the base and shiftable by a link 20 pivoted to a bell crank lever 21. The lever 21 is mounted on a small bracket 22 on the base and is provided with a treadle 23 which projects under the chuck in its second position. A coil spring 24 is attached to the lever 21 and to the base, the tendency of the spring being to hold the chuck in neutral position. By either pressing down on the treadle or raising it, the operator may revolve the shaft 8 at either fast or slow speed, the clutch being of such construction that it will remain in driving relation when once thrown in until removed. The forward end of the shaft 8 projects to a point directly opposite the line of the chuck driving shaft and is provided with a clutch 25 which may be connected or disconnected at will in a manner to be explained later.

The two speed drive for the core chuck in either the second or the fourth position is the same, the jack shaft corresponding to the jack shaft 10 being designated by the numeral 26 and the clutch corresponding to the clutch 25 being designated by the numeral 27, and the treadle by the numeral 28.

The shaft 10, which is constantly rotating in the manner described, is provided with a bevel pinion 29 at its inner end, which meshes with a bevel gear 30 carried on a sleeve 31 loosely mounted on a shaft 32, at right angles to the shaft 10, carried in uprights 33 and 34 secured to the base. The shaft 32 and the sleeve 31 are adapted to be locked for rotation by a clutch 35 carried on the shaft 32, the cone 36 to operate the clutch being arranged to be shifted along the shaft 32 by a spanner lever 37 which is pivoted on the bracket 38. A double link 39 connects the lower end of lever 37 with a lever 40 secured to a rock shaft 40ª mounted in brackets 41 on the base. The lever is connected by shaft 40ª to a treadle 42 which projects under the clutch in its third, or bead placing position.

The outer end of the shaft 32 carries a sprocket wheel 43 above which is mounted a second sprocket wheel 44 on a stub shaft 45 located on the standard 34. A sprocket chain 46 is trained over the wheels 43 and 44 and in contact with an adjustable idler 47 which serves as a chain tightener. The outer end of the shaft 45 carries a clutch 48, similar to the clutches 25 and 27, which clutch drives the core in the third or bead placing position.

The drive mechanism for rotating the core carrying chuck in the first position will now be described.

The shaft 26 which is continuously rotating is provided with a bevel gear 49 at its inner end which meshes with a bevel gear 50 carried on a sleeve 51 rotatably mounted on a shaft 52. The shaft 52 is supported at its inner end in a short standard 53 and at its outer end in the upright 54. A clutch 55 is arranged midway on the shaft and by means of it the shaft may be rotated, the clutch being operated by a spanner lever 56 pivoted on the bracket 57, and is in turn operated by a link 58 pivoted at its other end to a treadle lever 59 which is accessible to the operator at the core in its first position. The outer end of the shaft 52 carries a sprocket wheel 60 and above the shaft 51 is mounted a stub shaft 61 which carries a second sprocket wheel 62. A sprocket chain 63 is trained over the wheels 60 and 62 and is arranged to be tightened by an adjustable idler sprocket 64. The shaft 61 is formed with a clutch 65 which serves to drive the core in its first position. The clutches 25, 27, 48 and 65 are all grab clutches similar in shape and arranged to be coupled to each core rotating mechanism in succession.

The turn table is arranged to be driven from the jack shaft 26 which for this purpose carries, loosely mounted, one member 66 of a clutch which is fastened to a spur gear 67 in mesh with a large gear 68 carried on a shaft 69 supported in a bracket 70 on the base of the machine. On the outer end near the turn table the shaft 69 carries a bevel pinion 71, which meshes with a bevel pinion 72 carried on a vertical stub shaft 73 supported on the base. The stub shaft carries a toothed wheel 74 which drives the turntable, as will be described later.

The clutch member 66 is arranged to be coupled to the continually rotating shaft 26 by a shiftable member 75 which is moved longitudinally of the shaft 26 by a spanner lever 76 angular in shape and pivoted on a standard 77 secured to the base. The other end of the lever 76 is pivoted to a slide 78 arranged to be moved to and fro in a box 79 on the top of a standard 800 mounted on the base. The other end of the slide carries a roller 80, which is arranged to contact the inside surface of the turntable which is shown at 81 and will fit in notches 82 on the inner surface of the turntable, there being one notch for each core support. The arm 78 is provided with a tail piece 83 which projects out over the turntable for a purpose to be later described.

The slide 78 carries a pin 84 and the box 79 a pin 85 between which is fastened a spring 86 which serves to keep the slide 78 at its outer limit of movement.

In order to draw the slide backward from the turntable, which action couples the two sections of the clutch 66—75 at the same time removing the roller 80 from the notch 82, there is pivoted on the standard 800, at the point 87, a lever 88 the upper end of which is connected to the slide 78 by a pin 89 which passes through a slot 90 in the side of the box 79. A spring 91 is fastened at one end to the pin 89 and at the other to the base. The lower end of the lever 88 is pivoted to a link 92 the outer end of which is pivoted to a bell crank lever 93 which is rockingly mounted on a bracket 94 secured to the base. The lever 93 is provided with a foot piece 95 which is conveniently arranged for the operator in the first position.

When all of the operations in the four positions have been completed, the operator in position No. 1 steps on the treadle 95 releasing the roller 80 and operating the clutch which drives the toothed wheel 74. On the lower side of the turntable 81 are a series of pins 96 with which the wheel 74 engages and which serve to revolve the turntable. The turntable is provided on its under face with a circular rail 97 and is supported on a series of flanged rollers 98 which are supported for rotation in brackets 99 on the base, the rollers being distributed about the base as are necessary to support the turntable. As soon as the turntable has started to revolve, the operator releases the treadle 95 and the roller 80 travels over the inside surface of the turntable.

The inside surface of the turntable is divided into a series of arcs 100, four in number, between the notches 82 and spaced in toward the center of the turntable a sufficient distance to maintain the clutch 66—75 in engagement. Before the roller 82 reaches the next notch in the turntable, the inside surface is cut away slightly to form other arcs 101 spaced outwardly from the center of the turntable sufficiently to disengage the clutch so that the turntable continues to move of its own momentum until the roller 80 drops into the next notch.

At the time the roller drops into the next succeeding notch, there is arranged a braking apparatus to stop the movement of the wheel 74. To provide for this action, there is fastened on the slide 78 a rod 102 which projects toward the center of the machine and passes through an eye 103 on the upper end of a lever 104 secured to a horizontal rod 105 mounted in lugs 106 on the base of the machine. The rod 105 extends to a point opposite the clutch 66 where it has secured to it a lever arm 107 which terminates under the part 66 and carries a brake shoe 108 arranged to contact with the outer periphery of the clutch when the slide 78 is near the outer limit of its movement, that is when the roller 80 passes into the notch 82.

On the inner end of the rod 102 on the outer side of the eye 103 are secured lock nuts 109 which strike the upper end of the lever 104 and move it to the left as viewed in Fig. 5. The extreme inner end of the rod 102 carries a nut 110 between which and the end of the lever 104, about the rod, is mounted a coil spring 111, which presses the brake shoe against the surface of the clutch 66. An additional spring 112, (Fig. 4) connects the lever 104 with the standard 800 and assists the spring 111.

To prevent the turntable from overrunning the position it should occupy, there are provided at points opposite the notch 82 a set of pivots 801 upon which are mounted levers 802, the inner end of each of which projects slightly beyond the tail piece 83 of the reciprocable slide 78. The other end of the lever rests against a pin 803 at one side and carries a spring 804 which contacts a stop 805 on the table. If the table should overrun slightly the lever will be moved to compress the spring 804, which will return the turntable to its proper position.

The mechanism which has been described furnishes an easily operable and efficient connection for moving the turntable to advance each core through the various positions.

*Turntable and core supports.*

The turntable has been partially described as was necessary in the description of the driving mechanism for it, and as will be understood from the brief résumé of the operation of the machine given at the opening of the specification, carries a number of core supporting and revolving devices equal to the number of operations or positions which are made use of in this machine. As shown there are four core supports, but this number may be increased or diminished as the number of operations or stations may make desirable. All the core supports are similar and one only will be described, particular refrence being had to Figs. 4, 7, 8, 11 and 12.

Arranged on the turntable 81 at points equidistant about it are a number of housings 113, each of which carries a slidable shaft 114 radial to the turntable, the inner end of which shaft is constructed with a grab clutch 115 adapted to mate with the grab clutches 65, 25, 48 and 27 in succession as the turntable moves from the first to the fourth position. The shaft 114 is shifted longitudinally to engage or disengage the clutches by a lever 116 pivoted in a bracket 117 on the outer face of the housing, and connected to a pin 118 on a collar 119 on the end of the shaft. Located interiorly of the housing is a bevel pinion 120 in splined relation to the shaft 114 and in mesh with a bevel gear 121.

The last named gear is carried on the end of a shaft 122 mounted in a sleeve 123 carried on the housing. A small pinion 124 is secured to the end of the shaft, in mesh with a gear 125, which carries a sleeve 126 rotatably mounted on the extended hub 127 of a hollow shaft 128 which is secured to the side of the housing 113.

On the sleeve 126 is secured the core holding chuck 129 which is provided with the expansible arms 130 designed to hold the core 131. The details of the chuck are not shown or described in this application being similar in most essential details to that shown in my prior Patent No. 1,256,841, dated February 19, 1918, except that I have provided the hand wheel 132 formed with the finger grips and a locking arrangement to prevent the chuck from becoming loosened as the core is rotated.

This locking arrangement takes the form of a ratchet and pawl device, mounted in the hand wheel 132. The pawl comprises an operating end 133 which projects upwardly slightly from the surface of the hand wheel and is pivoted at 134 in the recessed portion 135 of the hand wheel. A spring 136 holds the tail 137 of the pawl through an opening 138 in the body of the hand wheel and in contact with one of a series of teeth 139 cut into the face of the chuck. By the mechanism just described the chuck is maintained in expanded position, but may be easily released when it is desired to remove the core.

After each operation is completed on a set of cores the operators in their four positions about the core press the levers 116 toward the housings 113 and release the several clutches 115. The turntable operating mechanism is now set in motion by the man in the first position and the cores advance to the next point in the machine whereupon the lever 116 is moved to grip the two parts of the clutch and the cores may be started in rotation.

*The bead placing devices.*

On each shaft 128 there is slidably mounted a collar 140, which is formed integrally with a spider 141 connected with a ring 142 which is L-shaped in cross section and supports a second ring 143 in which are mounted a series of radially extending pins 144 carrying a set of rollers 145 which place the bead on the inner or housing side of the core. These rollers 145 are of a cross section to fit the contour of the bead 146 and are mounted close enough together to support the bead in the position it occupies on the tire.

Across the sleeve 140 extends a pin 147 which passes through two slots 148 in opposite sides of the shaft 128. This pin prevents the spider 141 from revolving and serves as a means for moving the bead placing ring 142 toward or away from the side of the core by means of a pull rod 149 which is attached at one end to the center of the pin, passes through the hub 127 and is provided on its outer end with a knob or handle 150.

The position of the inner bead placing ring, when applying the bead, is shown in dotted line in Fig. 12.

The outer bead 151 is held in a similar set of rollers 152 carried on pins 153 projected radially from a ring 154 seated in the outer periphery 155 of a spider 156. The spider is provided with a hollow hub 157 which is designed to fit over the projecting end of the sleeve 126 as shown in Fig. 12. With the outer bead positioned as shown in this figure and the inner bead positioned as shown in dotted lines, the beads may be pressed against the partially finished carcass 158 on the core by a hand lever inserted in the slot 159 in the pull bar.

The outer spider 156 is carried on a set of swinging arms 160 which are pivotally carried on a standard 161 at some distance away from the machine. The swinging arms may be vertically adjusted by a set screw 162 carried on the standard.

The outer spider is normally swung out of the way of the machine adjacent the third core position but when the bead is required to be positioned is swung around until it can be passed into position as shown in Fig. 12 and Fig. 4. The two bead placing rings are now forced against the partially finished tire as described, and the core rotated. This serves to press the bead firmly in position and roll in on the carcass. When this has been done, the inner bead ring is pushed back to the position shown in Fig. 12 and the outer bead ring swung out of the way. The operator at the third station now places new beads in the rings 143 and 154, the one in the ring 143 being carried around with the core until it again reaches the third position.

*Fabric stretching and applying devices.*

On any suitable number of the standards, which have been described as forming bearings for the several shafts, is supported a stationary platform or table 165, which carries the rolls for supplying the fabric and the stretching mechanism for giving the longitudinal stretch necessary to be exerted on the fabric to shape it to the core. For views showing this mechanism, reference is had to Figs. 1, 2, 3, 8, 8ª, and 8ᵇ. As the fabric stretching mechanism is called into play at positions 2 and 4, and as both are alike, only one will be described. As the fabric required to go around the beads is slightly wider than that required to constitute the first plies, it is cut to different widths in the two rolls.

Located centrally of the table 165 are two pairs of standards 166, the upper ends of which are forked to receive shafts 167 of drums 168 on which are mounted a roll of rubberized fabric and cotton liner wound together, 169. Each roll of fabric is positioned so as to be in line with the core when in its proper station.

The rubberized fabric passes from the top of the roll between a pair of idler rolls 170, which are carried on the top of a pair of standards 171, secured to the table 165 by bolts 171′ passing through slots 171″. From the rolls 170 the fabric passes over a platform bridge plate 172, being received between the upper and lower surfaces of two plates 173 which are bent in U-shape. The forward outside corners of the plates are pivoted at 730 to the bridge plate and the rear ends are connected by a link 731 pivoted to the plates at 732. As a result of this construction, should the fabric shift sideways in its passage from the drum 168 to the core, the receiving end of the plates 173 will shift to accommodate the shifting of the fabric, but the fabric will be guided accurately on to the core by the front ends of the plates.

On the lower end of the standard 171 is mounted a shaft 174 on which is pivoted a pair of rocking arms 175 which carry the fabric stretching rollers. This arm is rocked up and down on its pivot by a link 176 which is pivoted at one end to the shaft 177 of the lower roll 170, and at the other end to the short arms 178 of an operating lever 179 which is in turn carried on a pivot 180 located on one of the arms 175. Immediately adjacent the free end of the lever 176 is formed a U-shaped bend 181 in which the projecting pivot 180 may rest when the arm 175 is raised as shown in Fig. 8. The end of the lever 179 is provided with an operating handle 181ª. As shown in the dotted line position in Fig. 8, the lever, if moved to the left, will lower the rocking arm. In order to assist in raising the arm 175 with the stretching rollers carried thereon, heavy coil springs 182 are fastened to eyes 183 on the arms and to the ends of a rod 184 which is mounted in a pair of lugs 184′ extending outwardly from the upper end of the standard 171.

The outer ends of the arms 175 extend over the core and carry the stretching rollers for the rubberized fabric, the same being mounted in enlarged bearing plates 185 formed on the ends of the arms. The bearing plates carry a rod 186 on which is pivotally mounted the bridge plate 172 for supporting the fabric as previously described, the free end of the bridge plate being supported on the lower roller 170 when the arm 175 is raised, and on the rod 184 when the arm is lowered.

A roller 187 is carried above the rod 186 and acts as a guide roller for the fabric which passes thence over the top of a first stretching roller 188 and around a second stretching roller 189 to the core. The stretching rollers are both covered with rubber to firmly grip the fabric and are geared together by the intermeshing gears 190 and 191 so that the roller 189 runs a little faster than the roller 188 to take up any slack in the fabric passing between the rolls.

When the core 131 is in position to have fabric applied in either the second or fourth station, the operator swings the lever 179 to the left (Fig. 8) which lowers the arm 175 and the stretching rollers carried by it so that the whole framework is supported on the periphery of the core by a single retarding roller 192 which is secured on a shaft 193 rotatably mounted in and extending across the arms 175.

The circumference of the stretching rollers 189 is less than the circumference of the retarding roller 192, the difference being just the amount of the stretch desired to be given to the fabric. As the retarding roller rests directly on the surface of the core and as it is driven from the stretching roller 189 by a sprocket chain 194, which passes over a sprocket wheel 195 fastened to the shaft 197 of the roller 189 and over a sprocket wheel 196 fastened to the shaft 193 of the retarding roller, it will be seen that a definite elongation of the fabric will occur as it passes on to the core.

This measuring device for paying off a length of fabric of a certain and fixed percentage less than the circumference of the core is very accurate as a general rule, the only possibility of error arising from a slight slippage which may occur between the retarding roller and the surface of the core. In order to prevent this action, the machine is provided with mechanism shown in Figs. 8ª and 8ᵇ, which effectually prevents any slipping which would result therefrom.

The chain 194 is a little slack and is passed around two small sprocket wheels 198 above, and 199 below, so that the chain is in the shape of a diamond at all times. The two small sprocket wheels referred to are carried on the extremities of shorter arms of a cross shaped governor arm 200 which is pivotally mounted at one end on the shaft 197 of the stretching roller. On a lug 201 secured to the under side of the arm 175 is fastened one end of a band brake 202 which passes around a brake drum 203 on the shaft 197. The free end of the band brake is brought around and fastened to a pin 204 carried on a brake operating lever 205 which is pivoted at 206 on the lug 201. The opposite end of the lever 205 is connected to a link 207 which is pivoted to a pin 208 on the end of the governor 200 opposite its pivot.

The operation of this device is as follows:

As the fabric is drawn over the stretching roller, it rotates the roller in the direction of the arrow in Fig. 8ª. The rotation of the sprocket wheel 195, owing to the slackness of the chain, acts on the lower run to draw up on the sprocket 199 rocking the arm 200 upwardly slightly in the direction of the arrow. This operates through the link 207 and lever 205 to apply the brake to the drum 203. The mechanism is so adjusted that during the normal running of the machine, the brake is only lightly applied. If now, the pull of the fabric becomes so great that the roller 192 would tend to slip over the surface of the core, the slightly faster movement of the roller 189 draws up on the lower run of the chain and clamps the brake band tightly over the brake drum, arresting the rotation of the stretching roller. The action of this device is to let the fabric run out at just the proper tension and should there be a tendency for the retarding roller to slip on the surface of the core, this will be instantly checked.

The liner is separated from each roll 169 at its lowermost point and is passed down around a roller 208ª carried in a pair of standards 209 secured on the table 165 on the opposite side of the roll from the core. The upper ends of the standards 209 are forked as shown at 210 and in the fork is received the shaft 211 of a liner take-up drum 212, which rests on the surface of the roller 208 and is driven thereby, the drum 212 riding up between the standards as the diameter of the liner roll increases. Each roller 208ª is rotated by a cross belt 213 driven from a pulley 214 secured to its respective retarding roller shaft 193. By this device the liner is positively withdrawn from the roll of fabric at the same speed as the fabric is drawn off by the retarding or measuring roll 192.

As each core comes into positions 2 and 4, the operator in that position lowers the swinging frame by means of the lever 179 so that it is supported by the roller 192 resting on the surface of the core. The free end of the fabric hanging down over the roller 189 is then attached to the core and the core started in slow rotation. The fabric is now drawn through the stretching rollers until the core has made a number of revolutions to lay on the number of plies which it is desired to stitch at one time. When this has been done the operator severs the fabric between the core and the last stretching roller and with his hand sticks the end of the fabric on the next lower ply. The handle 179 is now swung to the right (Fig. 8) and the core is ready for the stitching operation.

If it is desired, the rolls of fabric and liner with the liner take-up mechanism may be dispensed with, the fabric being brought in a continuous strip directly from the assembly tables.

*Stitching mechanism.*

The fabric is spun down on the side of the core rotating at high speed by means of two pairs of stitching rollers arranged in the second and fourth positions, the first named pair being arranged to stitch the fabric under the bead, and the second named pair to stitch the fabric over the bead. The mechanism is so arranged that the rollers are automatically fed over the surfaces of the core, the pressure is constant toward the sides of the core, and when the rollers have completed their inward movement, they are automatically spread apart and withdrawn to their original position. In the case of the second pair of rollers, it is necessary to guide the spinning disks around the bead and to turn them slightly backward in order to stitch under the bead. It is also necessary to retard the forward advance of their working face slightly to allow them to properly stitch over the top of the bead. All of these considerations make the mechanism for directing the movement of the last rollers more complicated, and will make separate descriptions of parts of the two sets of spinning rollers necessary.

The means for advancing the rollers over the face of the core is the same in both cases and that will now be described.

The stitching mechanism is in both the second and fourth positions carried in a framework which is designated generally by the numeral 220 and is supported by a series of bolts 221 from the underside of the table 165.

Each clutch element 25 and 27 carries a sprocket wheel 222 around which passes a sprocket chain 223 to a second sprocket wheel 224 on the projecting end of a shaft 225 carried in bearings 226 formed at the lower end of a bracket 227 secured to the underside of the table. Between the bearings 226 the shaft carries a worm 228 which drives a worm wheel 229 secured to a shaft 230 carried in a bracket 231 supported from the underside of the framework. The end of the shaft 230 opposite the worm wheel has secured to it a gear 232. About the shaft 230 is loosely mounted a sleeve 233 which is formed with arms 234 at the sides of the bracket, the ends of the arms carrying a shaft 235. The end of this shaft over the gear 232 has secured to it a pinion 236 the other end of the shaft carrying a similar pinion 237. Secured to the sleeve 233 is an operating lever 238 which is bent as shown in Fig. 16 and is provided at its upper end with a handle 239 above the level of the table 165. By means of this handle the arms 234 may be rocked slightly, slots 240 being provided to permit the shaft 235 to oscillate in the bracket 231.

The purpose of rocking the arms 234 is to connect or disconnect the stitcher feeding mechanism, which is accomplished by moving the pinion 237 into and out of mesh with a gear wheel 241 fastened to a transverse shaft 242 carried in brackets 243 on the underside of the framework 220 (Fig. 23). A pinion 244 is secured to the shaft 242 midway of the framework and engages a rack 245 which carries the stitching mechanism to and fro.

The lever 238 normally hangs with the pinion 237 disengaged from the gear wheel 241, as shown in Fig. 18, being provided with a pin 246, midway its length, which is received in a slot 247 formed in a freely swinging catch or latch 248 which is loosely pivoted from a pin 249 in the end of a downwardly curved bracket 250 secured to the top of the framework 220. The slot 247 is provided with an offset portion, or recess 251, into which the pin may pass and in which it will be held so long as the swinging catch is undisturbed. In Fig. 16 the hand lever 238 is shown in idle or disengaged position, and in Fig. 22 in engaged position.

When the lever 238 is moved so that the recess 251 passes over the pin 246, the pinion 237, which is being driven from the clutch member 25 or 27 as described, feeds the rack forward advancing the stitching rollers over the side of the core. This forward movement continues until the rack reaches the outward limit of its travel, at which time the stitches have moved inward on the core to the position shown in Figs. 10 or 19. At this moment a pin 252 on the forward end of the rack strikes the rear face 253 of the catch and raises it releasing the pin 246 from the recess 251 allowing the handle to fall forward disconnecting the pinion 237.

Below the shaft 242 (Fig. 23) is supported, by the brackets 243, a second shaft 254 which carries a gear wheel 255 in mesh with the pinion 244. On the side of the framework 220 away from the gear 241 the shaft 254 carries a pinion 256 in mesh with a gear wheel 257 loosely mounted on the end of the shaft 242. The hub of the gear 257 carries a large sprocket wheel 258, at one point 259, on which is secured a sprocket chain 260, (Fig. 13) the end of the chain being secured to a plunger 261 in a pneumatic cylinder 262 secured to the table 165. In the case of the second spinning rollers the cylinder is secured to the underside of the table. In the case of the first spinning rollers, the cylinder is secured to the top of the table (Fig. 3). A coil spring 263 is received between the forward end of the cylinder and the plunger and a petcock 264 is secured to the rear end of the cylinder.

For the spring return for the carriage, I may substitute a weight or other equivalent mechanical device.

It will be understood now that as the stitchers advance over the side of the core, the spring is compressed, but when the latch 248 is thrown and the gear wheel 237 released, the spring will return the carriage to its normal position, the air cylinder cushioning the return.

To rely upon the mechanical advance of the stitcher rollers 265 from their position of rest underneath the table as shown in Fig. 16 to the point at which they commence their stitching operation would be a slow wasteful operation, so there is provided a device by which the operator may move the stitchers in position at once.

This device comprises a sprocket wheel 266 secured on the hub of the gear 257, to which is secured at the point 267 a sprocket chain 268 partially surrounding the wheel 266. The end of this sprocket chain is fastened to an arm 269 of a foot lever 270, pivoted to the base at 271 and provided with a treadle 272 (Fig. 2). An adjustable stop 273 is provided on the underside of the lever 270 which contacts with the base 1 to limit the downward movement to a point to bring the stitching rollers almost in contact with the surface of the core.

When the operator desires to stitch the tire, the lever 238 being in its lowermost position, the operator steps on the treadle 272 advancing the stitchers to the point at which the stitching operation commences. He then raises the lever 238 to the position shown in Fig. 22 and throws the core into revolution at high speed. The stitcher is now fed forward by the reducing gearing set forth until the return operation takes place in the manner described.

The stitchers for the first plies are shown in Figs. 9 and 10 and will now be described, reference also being had to the other figures which show such parts as are in common between the two sets.

The rack 245 is guided in a slot 274 in the lower plate 275 of the housing 220, being held down by two cam plates 276 secured on the plate 275, and is provided at its rear end with an abutment 277, on which is formed a stop lug 278. Into the upper surface of the abutment is secured a pivot pin 279 on which are mounted two halves 280 and 281 of a toggle joint. These two toggle joint members are triangular in shape, the facing sides contacting the stop lug 278 when the stitchers are being fed forward or at rest. When, however, the rack is being drawn back the action of the toggle is shown in Fig. 21, the joint breaking to draw the stitchers apart so that they can be withdrawn around the core.

The parts 280 and 281 are pivoted at 282 to longitudinal arms 283. The tail ends of the arm 283 are provided with pins 284 which are so located as to strike the long sides of the toggle members and limit their opening movement. Pivots 285 are located about midway of the arms 283 and carry the inturned ends 286 of the stitcher carrying arms 287. In the first pairs of stitchers the shafts of the stitching rollers are rigidly connected to the arm 287.

The outer end of each arm 283 carries a pin 289 which projects through a hole 290 in the arm 287. A coil spring 291 surrounds the outer end of the pin and bears against the outer face of the arm 287, being held by a nut 292, and serves to exert the proper inward resilient pressure to hold the spinning roller yieldingly against the side of the core. A screw threaded bolt 293 is secured in the spinning roll arm and bears against the arm 283 serving to limit the inward movement of the former arm.

The spinning mechanism is so arranged and constructed that a constant and uniform pressure will always be exerted against the side of the core and for this purpose the stitching roller is guided in such manner that it will follow around the side of the core. The front end of each arm 283 carries a vertical pin 294 which supports a cam roller 295 on the underside of the arm, this roller moving in a cam track 296 in the cam plate.

For the first spinning rollers this cam track is of the form shown in Figs. 9 and 10 comprising a long straight portion 297 in which the roller travels during the preliminary advance of the stitchers by the foot treadle, a curved portion 298 in which the rollers travel during the stitching operation around the core, which curved portion is so laid out that the rollers 265 follow the curvature of the core, and a straight portion 299 which the rollers follow when the edges of the fabric are being finished on the tongue of the core. This method of guiding the rollers to make them conform to the curvature of the core ensures an even pressure always being exerted against the side of the core during the stitching operation.

It is thought that the action of the stitching rollers will have been understood from the description given, it being sufficient to say that upon reaching the outward limit of their movement the feeding mechanism is disconnected and the spring withdraws the stitchers, the first operation being to expand them by the breaking of the toggle joint, the spring rollers being guided around the core in their forward or backward movements by the cam slots.

Inasmuch as the stitchers 265 are compelled to follow the contour of the bead in their second stitching operation, the cam track is shaped differently for the second pair of stitchers and means are provided for turning the stitchers about to change the angle of the stitcher with the tangent at the point of contact to stitch under the bead. Means are also provided to slow up the advance of the active edge of the stitchers in going over the top of the bead so as to thoroughly stitch the fabric at this point. This mechanism is shown in Figs. 17 to 22.

Whereas the stitchers in the first operation are at right angles to the plane of the core, in the second operation they are placed at a slight backward angle, the purpose of this being presently apparent. These stitchers are mounted on an L-shaped arm 300, pivotally mounted at 300', the tail end of which projects outwardly from the arm 287 and is pivoted to a rod 301 which passes through a lug 302 on the side of the arm 287. A coil spring 303 surrounds the rod and holds the stitching rollers at their correct angular position, the lug 302 serving as a stop.

The rear end of each rod 301 is pivoted at 304 to levers 305 and 305ª, which are in turn pivoted to the arms 287 at 306. The lever 305ª lies over the lever 305. On the forward end of one of the cam plates is arranged a pin 307 which is arranged to strike the end of the lower lever 305 as the rack approaches the forward limit of its movement, and in the housing 220 is arranged a second pin 308 which is arranged to strike the end of the upper lever 305ª at the same time. A third pin 309 is carried on an adjustable plate 310 on top of the housing 220 and projects into the path of both the levers 305 and 305ª at about their midway point and between the pins 307 and 308.

The action of the stitchers caused by their forward advance and the function of the pins and levers is clearly shown in Fig. 20. As has been mentioned heretofore, the stitcher 265 of the second set is inclined backwardly slightly from a plane normal to the plane of the core being held in that position by the stop lug 302. Taking for example, the upper stitching roller shown in the drawings, the position of this stitcher during the major portion of its travel is shown in full lines in Fig. 20. When now the end of the lever 305 strikes the pin 307, the continued advance of the stitcher causes it to turn slowly about its pivot 300', the fact that the pin 307 is set to strike the far end of the lever causing the turning movement to take place slowly. It will be seen that the turning movement causes the working edge of the stitcher to move backwardly and the differential between the forward rate of advance of the stitcher and the rearward movement due to the turning is just sufficient to cause the stitcher to slowly traverse the top of the bead to shape the fabric at that point. When the stitcher reaches the heel or top of the bead, it assumes the position shown in dot and dash line in Fig. 20. At this moment the lever 305 strikes the pin 309, which being nearer the fulcrum of the lever causes a rapid turning movement of the stitcher causing it to assume the position shown in dotted lines in Fig. 20, getting in behind the bead and shaping the fabric.

In order to make the stitchers follow the contour of the core and bead, the cam track for the second stitchers is changed slightly. They are provided with the same straight portions 311 in which the cam rollers operate during the advance caused by the foot treadle, a curved portion 312 corresponding to the major portion of the carcass, a return portion 313 outwardly curved to correspond to the outside of the bead, and a straight portion 314 corresponding to the shape of the tongue of the core.

The second set of stitching rollers are opened up and returned to original position in the same manner as the first set.

In order to properly shape the fabric to the core, it is desirable that the plane of the stitchers be inclined to the path of the fabric at the point of contact of the stitcher with the core, the beneficial results of this action being described in my prior Patent No. 1,253,105, dated January 8, 1918. In order to accomplish the same result, I have, in this machine, set the axis of the stitchers slightly below the center of the core as shown in Fig. 8. This accomplishes the same result as the arrangement shown in my prior patent.

*Trimming operation.*

When the core has passed the fourth position, the carcass is complete except for the trimming of the edges of the fabric at the base of the bead. This operation is performed in the first position by the mechanism shown in detail in Figs. 24 to 28, the general location being shown in Figs. 1, 3 and 5.

Secured to the underside of the table 165 by bolts 315 at a point so its center is in line with the center of the core in its first position is a cutter box designated generally by the numeral 316 which comprises a top plate 317 and a bottom plate 318 held apart by four corner posts 319. The lower plate 318 is formed with a trough shaped central portion 320 and with rabbeted slideways 321 on either side of the trough portion. Mounted to reciprocate in the slideways 321 is a saddle plate 322, the rear end 323 of which projects beyond the rear of the lower plate and is provided with a downwardly extending lug 324 in which is threaded a set screw 325. Above the saddle plate 322 is mounted a cover plate 326 which is secured to but spaced from the saddle plate by bolts 327. Also passing through the two plates 322 and 326 are two bolts 328 which serve as pivots for knife carrying levers 329. Each lever 329 is composed of an upper leaf 330 and a lower leaf 331 spaced apart at their forward ends by a plate 332 secured by a bolt 333. Between the two leaves are also received the ends of a toggle lever composed of two links 334, each pivoted at 335 to the knife levers and jointed at the centers to one end of a yoke 336.

The saddle plate 322 is formed with a slot 337 opening from its front edge, in the center of the plate and extending to a point near the rear of the plate. The sides of the slot are recessed to form a pair of facing grooves 338. On the underside of the plate 322 at the sides of the slot 337 are secured two racks 339 and in the slot 337 is mounted a slide 340. The rear half of the slide is formed with a rack 341 and the rear end is designed to strike against the rear wall 342 of the slot 337, being normally held against it by a spring 343 attached to a pin 344 on the end of the saddle and a pin 345 on the upper surface of the slide 340. The rear end of the yoke 336 is secured to the upper surface of the slide by a bolt 346.

Near the center of the trough 320 is located an aperture 347 through which passes a pinion 348 which is adapted to mesh with the racks 339 and the rack 341. Pinion 348 rotates on a shaft 349 supported in hangers 350 secured to the underside of the plate 318, and is located between set collars 351 on the shaft. A large gear 352 meshes with pinion 348, being secured to a shaft 353 located under the shaft 349 in the hangers 350. A small pinion 354 is secured to the end of the shaft 353 and is in mesh with a large gear 355 rotatably mounted on the end of shaft 349 at the side of the knife box. A hand lever 356 is secured to the upper side of the gear 355 and projects above the table 165 at a convenient point for the operator.

The free end of the lower leaf 331 is slotted as at 357 and the upper leaf 330 is bent upwardly slightly to receive a knife block 358 also slotted as at 359. Passing through the ends of the two leaves of the knife lever and the knife block is a bolt 360, the central portion of which carries a slot 361 in which is received the trimming knife 362, a nut 363 serving as a means for clamping the knife in position.

The operation of the knife mechanism is as follows:

When the core has been brought into the first position ready to be trimmed, the operator seizes the lever 356 and moves it downwardly, at the same time starting the core in rotation by means of the treadle 59. The rotation of the pinion 348, which is in mesh with the side racks 339, only at this time, moves the saddle plate 322 forward, the knife carrying arms and the rack being spread open in the position shown in Fig. 24. This enables the knives to pass around the wide part of the tire and the forward movement of the saddle plate continues until the racks pass out of mesh with the pinion 348 at which time the set screw 325 strikes a lug 364 on the rear of the plate 318. Before the forward movement of the saddle plate is arrested, the rack 341 on the slide 340 has become enmeshed with the pinion 348. A continued rotation of the pinion 348 advances the slide 340 in its slot 337 and the yoke 336 causes the toggle levers 334 to bend drawing in the knife levers 329 about their pivots 328, until the knives pass into trimming position as shown in Fig. 26. Upon rearward movement of the hand lever, the slide 340 is first withdrawn spreading the knives so that they will pass the core until the end of the slide strikes the rear end 342 of the slot, which moves the saddle 322 backward until the racks 339 are in mesh with the pinion 348, whereupon a continued return movement of the pinion returns the saddle and knives within the knife box. The gearing between the hand lever and the rack is such that the trimming knives will be advanced from their position of rest to their cutting position in a little over a quarter of a turn of the handle.

*Operation.*

No detailed description of the operation of the different parts of the machine will be attempted at this time, it being believed that the operation of the several mechanisms will have been made clear in the main portion of the specification.

For the purposes of general survey of the operation of the machine, it will be assumed that the machine is manned by four operators located one at each core position, as shown in Figs. 3 and 4, although it is possible to dispense one or two of the operators relying upon the remaining men to attend to two operations, as the machine, when started, works automatically.

However, assuming that there are four men stationed around the machine, the man in number 1 position is preferably the inspector, his duties being to trim the carcass, to inspect the finished carcass for possible defects, and to remove the core and replace it with a fresh one. As the carcass reaches the first position, the operator moves the lever 356 down as far as it will go which action brings the knives into position, at the same time the core is started in rotation by pressure applied to the treadle 59 and the carcass is trimmed. The chuck handle is now rotated to withdraw the clamping arms from the core with the finished and inspected carcass and a new core is placed in position and clamped. When the other operators are ready, the treadle 95 is momentarily depressed and the turntable is revolved a quarter of a turn.

While the operator in No. 1 position has been doing this, the operator in number 2 position lowers the stretching mechanism, secures the leading end of the fabric to the fresh core and starts the core in slow rotation, which stretches the fabric over the core. When two or more plies which go under the bead are wrapped about the core, the rotation of the core is stopped and the fabric is cut at the proper point and the stretching mechanism raised out of contact with the core. The loose end of the ply is pressed against the skirts of the fabric and the core is started in rapid rotation by the proper manipulation of the treadle 23. The operator now depresses the treadle 272 as far as it will go, which advances the stitchers to the point of commencement of the stitching operation. The handle 238 is now raised throwing the stitcher feeding mechanism into operation which advances the stitchers, spinning down the skirts of the fabric. When the stitchers have reached the outward limit of travel, the feeding mechanism is detached and the stitchers automatically return to their first position, spreading apart as they withdraw. This completes the operation in the second position.

In the third position, the operator draws up the inside bead ring 142, brings the outside bead ring 155 into position, draws the two rings against the side of the carcass and starts the core in rotation. When the beads have been rolled into position, the two bead rings are removed and the operator places new beads in the rings.

In the fourth position, the operator goes through the same set of movements as the second position operator, the mechanism described stitching the fabric over the bead.

All of the operators work at the same time and it will be seen that the manufacture of a tire carcass is much improved over former machines and methods.

Many of the details of the machine may be altered within the province of mechanical skill, but it is my intention to cover such changes and modifications as are fairly within the scope of my invention as set forth in the claims herein.

Among the modifications which would readily be suggested to the skilled mechanic, would be a modification of the stitcher tilting mechanism to enable the machine to be adapted to the manufacture of straight side tires, as well as to the manufacture of clincher tires as shown, which modifications within the scope of the appended claims are intended to be covered by the invention.

I claim:

1. In a machine for the manufacture of tire casings, a movable table, a core support on said table, a shaping mechanism arranged at one point about the table, a second shaping mechanism arranged at another point about the table, each of said shaping mechanisms operating upon the fabric progressively radially from the tread to the bead, and means to move the table to present the core support to the said shaping mechanisms in succession.

2. In a machine for the manufacture of tire casings, a movable table, a core support on said table, a fabric shaping roller arranged at one point about the table, a second fabric shaping roller arranged at another point about the table, means to move the said rollers radially of the core, and means to move the table to present the core support to the said shaping rollers in succession.

3. In a machine for the manufacture of tire casings, a movable table, a core support on said table, a fabric shaping mechanism at one point about the table, a second fabric shaping mechanism at another point about the table, means for moving the table to present the core support to the shaping mechanisms in succession, means for driving the core through its axis at each point about the table and separable connections in each driving mechanism.

4. In a machine for the manufacture of tire casings, a movable table, a core support on said table, a fabric shaping mechanism at one point about the table, a second fabric shaping mechanism at another point about the table, means for moving the table to present the core support to the shaping mechanisms in succession, means independent of the shaping mechanism for rotating the core at each point about the table and separable connections in each rotating mechanism.

5. In a machine for the manufacture of tire casings, a movable table, a core support on said table, a spinning roller arranged at one point about the table adapted to shape the first layers of fabric to the core, a second spinning roller arranged at another point about the table, means to change the angle of the second roller with relation to the core to stitch the fabric over the bead, and means to move the table to present the core support to the said spinning rolls in succession.

6. In a machine for the manufacture of tire casings, a core support, a spinning roller adapted to shape the first layers of fabric to the core, a second spinning roller, means to change the angle of the second spinning roller with relation to the core to stitch the fabric over the bead, and means to move the core support from one spinning roller to the other.

7. In a machine for the manufacture of tire casings, a core support, a spinning roller adapted to shape the first layers of fabric to the core, a second spinning roller, means to change the angle of the second spinning roller with relation to the core to stitch the fabric over the bead, and means to move the core support and the spinning mechanisms relatively to one another to present the core to the spinning mechanisms in succession.

8. In a machine for the manufacture of tire casings, a support, a core carried on said support, two shaping mechanisms for stretching the fabric radially toward the bead and applying it to the core, said mechanisms being located adjacent the core in two positions, one of said shaping mechanisms for applying the fabric to the core to form the under bead layers, and the other mechanism to shape the fabric over the first said layers and over the beads of the tire, and means for shifting the support relative to the shaping mechanism.

9. In a machine for the manufacture of tire casings, a support, a core carried on said support, said support and core being shiftable relatively to each other to place the core in two positions, two shaping mechanisms for stretching the fabric radially toward the bead and applying it to the core, said mechanisms being located adjacent the core in its two positions, one of said shaping mechanisms for applying the fabric to the core to form the under bead layers, and the other mechanism to shape the fabric over the first said layers and over the beads of the tire and means independently operative of each other to rotate the cores in their two positions.

10. In a machine for the manufacture of tire casings, an annular table, a core support on the table, a spinning mechanism, a bead placing mechanism, a second spinning mechanism, and means to move said table to present the core support to the mechanisms in the order named.

11. In a machine for the manufacture of tire casings an annular table, a core support on the table, a spinning mechanism, a bead placing mechanism, a second spinning mechanism, and a trimming mechanism, and means to move said table to present the core support to the said mechanisms in the order named.

12. In a machine for the manufacture of tire casings, an annular table, a plurality of core supports on the table, a fabric shaping mechanism adapted to place the plies of fabric under the bead, a second fabric shaping mechanism adapted to place the plies of fabric over the bead, a trimming mechanism, and means to move the table to present the core supports to the said mechanisms in rotation.

13. In a machine for the manufacture of tire casings, an annular table, a core support on the table, a spinning mechanism for shaping the fabric plies under the bead, a second spinning mechanism for shaping the fabric plies over the bead, a trimming mechanism, and means to move said table to present the core support to the mechanisms in the order named.

14. In a machine for the manufacture of tire casings, an annular table, a fabric shaping mechanism adapted to place the plies of fabric under the bead, a bead placing mechanism, a second fabric shaping mechanism adapted to place the plies of fabric over the bead, a trimming mechanism, a plurality of core supports on the table equal in number to the number of said mechanisms, and means to move the table to present the core supports to said mechanisms in rotation.

15. A tire making machine comprising a plurality of core supports, a spinning roller, means to advance the spinning roller over the core, a second spinning roller, means to advance the second spinning roller over the core, means to change the angle of the second spinning roller at a point of its advance, means for feeding fabric to the core, and means to move the core supports in line with the spinning rollers.

16. A tire making machine comprising a plurality of core supports, a spinning roller, means to advance the spinning roller over the core, a second spinning roller, means to advance the second spinning roller over the core, means to change the angle of the second spinning roller during its advance, fabric supply means adjacent each of the spinning rollers, and means to move the core supports relative to the spinning rollers.

17. A tire making machine comprising a core support, a spinning roller, means to advance the spinning roller over the core, a second spinning roller, means to advance the second spinning roller over the core, means to change the angle of the second spinning roller during its advance, fabric supply rollers adjacent the spinning rollers, and means to move the core support to bring it in line with either spinning roller.

18. A tire making machine comprising a circular platform, an annular table around said platform, fabric supply rollers on said platform, spinning rollers on said platform, one pair of spinning rollers adapted to stitch the fabric under the bead, the other pair being adapted to stitch the fabric over the bead, a core support on said table and means to move the table.

19. A tire making machine comprising a circular platform, an annular table around said platform, fabric supply rollers on said platform, spinning rollers on said platform, one pair of said spinning rollers adapted to stitch the fabric under the bead, the other pair being adapted to stitch the fabric over the bead, means to change the angle of the second pair of rollers in going over the bead, a core support on said table and means to move the table to present the core support to either of said spinning rollers.

20. A tire making machine comprising a stationary support and a movable support, fabric supplying means stretching mechanism on said stationary support, spinning rollers also carried on said stationary support, a core carried on said movable support and means for rotating the core, said rollers stretching the fabric radially during the rotation of the core.

21. A tire making machine comprising a stationary support and a movable support, fabric supply rolls on said stationary support, stretching mechanism on said stationary support, a pair of spinning rollers to shape the fabric to the core under the bead, a second pair of spinning rollers to shape the fabric over the bead, and means carried on the movable support to hold and rotate a core.

22. A tire making machine comprising a stationary support, and a support movable relative thereto, a fabric supply mechanism on the stationary support, and stretching mechanism associated therewith, and a second fabric supply mechanism and an associated stretching mechanism mounted on said stationary support, a plurality of core holders on said movable support, and means to move said support to bring and maintain said core holders in line with the fabric mechanisms and stretching mechanisms.

23. A tire making machine comprising a stationary support, and a support movable relative thereto, a unit for applying the fabric under the bead mounted on the stationary support, said unit comprising a fabric supply, a stretching mechanism, and a fabric applying mechanism, a second unit for applying the fabric over the bead mounted on the stationary support, said second unit comprising a fabric supply, a stretching mechanism and a fabric applying mechanism having provision for shaping the fabric around the bead, a plurality of core holders on the movable support, and means to align the core holders with the said units.

24. A tire making machine comprising a platform, an annular table around the platform, a unit for applying the fabric under the bead mounted on the platform, said unit comprising a fabric supply roll, a stretching mechanism and a fabric applying mechanism, a second unit for applying the fabric over the bead also mounted on the platform, said second unit comprising a fabric supply roll, a stretching mechanism and a fabric applying mechanism having provision for shaping the fabric around the bead, a plurality of core holders on the table and means for moving the table to bring the core holders in line with the units.

25. In a tire making machine, the combination of a stationary table, and a movable table, fabric shaping mechanisms arranged at two locations about the stationary table, and a tire trimming mechanism at a third location on the stationary table, a plurality of core holding chucks located on the movable table, means for moving the table to bring the chucks into operative relation to fabric shaping mechanisms and the trimming mechanism, and means to rotate the chucks in the several locations independently of one another.

26. In a tire making machine, the combination of a stationary table and a movable table, a fabric supplying mechanism located at one point on the stationary table, a tire trimming mechanism located at another point on the stationary table, a plurality of cores on the movable table, means to move the table to present the cores to the supplying mechanism and the trimming mechanism in succession and means for rotating a core in either position independently of the core in the other position.

27. In a tire making machine, the combination of a stationary table and a movable table, a fabric supplying mechanism and a fabric shaping mechanism located at one point on the stationary table, a tire trimming mechanism located at another point on the stationary table, a plurality of cores on the movable table, means to move the table to present the cores to the supplying and shaping mechanisms and the trimming mechanism in succession and means for rotating a core in either position independently of the core in the other position.

28. In a machine for the purpose set forth, a tire building core, means for rotating the core, fabric guiding means and a pivotally mounted plate in said guiding means, said core being located with its plane central to the plate at its pivoted end.

29. In a machine for the purpose set forth, a tire building core, fabric supplying means and a pivotally mounted element for shifting the fabric transversely should it be off-center with respect to the core as it comes from the supplying means.

30. In a machine for the purpose set forth, a tire building core, fabric supplying means and guiding means for the fabric from the supply to the core, said guiding means including an element freely shiftable transversely of the fabric and operating to center the fabric with respect to the core.

31. In a machine for the purpose set forth, a tire building core, fabric supplying means and guiding means for the fabric from the supply to the core, said guiding means being fixed at one point centrally to the core, but movable at one end transversely by lateral movement of the fabric as it passes to the core.

32. In a machine for the purpose set forth, a tire building core, fabric supplying means and guiding means contacting the edges of the fabric said guiding means being pivotally mounted and movable at one end transversely by lateral movement of the fabric as it passes to the core.

33. In a tire making machine, a table, a set of core holders on said table, a bead placing ring on each core holder at one side of the core, and a single bead placing ring for the other side of the core, and a movable arm supporting the single bead placing ring.

34. In a tire making machine, a table, a set of core holders on said table, a bead placing ring on each core holder at one side of the core, a single bead placing ring for the other side of the core, a movable arm supporting the single bead placing ring, and means to move the table to bring the cores into operative relation to the single bead placing ring.

35. In a tire making machine, a movable support, a plurality of core holding chucks on said support, a driving member at each station of said core chucks as they are carried about the machine by the support means for rotating certain of said driving members at two speeds and the remainder at single speeds, and means for operatively connecting said core chucks and said driving members.

36. In a tire making machine, a rotary turntable, a plurality of core holding chucks carried on said turntable, fabric applying and shaping mechanism adjacent the turntable, a bed plate supporting the turntable, a clutch connected with each said chuck, a driving connection carried on said bed plate to actuate the core during the operation of the applying and shaping mechanism and means to rotate the turntable to bring each core opposite the fabric applying and shaping mechanism and each clutch in register with the driving connection.

37. In a tire making machine a shiftable support, a plurality of core holding chucks on said support, fabric applying and shaping mechanism adjacent the support, a bed plate for said support, a driving connection carried on said bed plate to actuate a core during the operation of the applying and shaping mechanism, means for rotating the chucks and means to shift the support bringing each core opposite the fabric applying and shaping mechanism and each chuck rotating means opposite the driving connection.

38. In a tire making machine, a shiftable support, a plurality of cores on said support, a plurality of fabric applying and shaping devices and a bead applying mechanism all located at different stations and within the path of said support and independently operable and releasable driving connections for the cores in their different positions.

39. In a tire making machine, a rotary turntable, a plurality of core holding chucks carried on said turntable, fabric applying and shaping mechanism adjacent the turntable, a bed plate supporting the turntable, a clutch connected with each said chuck, driving mechanism on said bed plate, a change speed device in said driving mechanism, a clutch driven by said driving mechanism, a complementary clutch on each said chuck, and means to rotate the turntable to bring the clutch on each chuck into register with the driving clutch.

40. In a tire making machine, a rotary turntable, a plurality of core holding and rotating chucks carried on said turntable, a clutch connected with each said chuck, fabric spinning devices at a plurality of points adjacent the turntable, driving mechanism, change speed devices in said driving mechanism, clutches complementary to said first named clutches driven through said change speed devices, means to move said turntable to bring the complementary clutches in coupling relation, and driving means to advance said spinning devices over the sides of the core.

41. In a tire making machine, a rotary turntable, a plurality of core holding and rotating chucks carried on said turntable, a clutch connected with each said chuck, fabric stretching rollers located over said turntable and movable into co-operation with the cores, fabric spinning devices, driving mechanism, change speed devices on the driving mechanism, clutches complementary to said first named clutches driven through said change speed devices, means to move said turntable to bring the complementary clutches in coupling relation, and driving means to advance the spinning devices over the sides of the core.

42. In a tire making machine, a driving member, a pair of two-speed units, and a pair of single speed units arranged about said members in alternation, a turntable, four core holding chucks on said turntable, means to connect all of said chucks with said units, and means to move the turntable to shift the chucks about the units.

43. In a tire making machine, a stationary support, a driving member, a pair of two speed units and a pair of single speed units arranged on said stationary support in alternation, a turntable on said stationary support, a plurality of core holding chucks on said turntable, means to connect all of said chucks to said units, fabric applying and shaping mechanisms associated with said two speed units and bead applying and trimming mechanisms associated with said single speed units, and means to move the turntable to shift the chucks about the units.

44. In a tire making machine, a driving member, a plurality of driven units, change speed mechanisms in some of said units, a turntable, a plurality of core holding chucks on said turntable equal in number to said units, means to connect all of said chucks with said units, and means to move the turntable to shift the chucks about the units.

45. In a tire making machine, a driving member, a plurality of drive units, change speed mechanisms in some of said units, a turntable, a plurality of core holding chucks on said turntable equal in number to said units, means to connect all of said units, and means operable from one of said units to rotate the turntable through a partial revolution to shift the chucks from unit to unit.

46. In a tire making machine the combination of a fabric and bead carrying rotary core, a fabric forming roller, an arm on which the bearing for said roller is movably mounted, means for automatically advancing said arm radially of the core, a guide acting on said arm to cause the edge of the roller to follow automatically the contour of the fabric and bead on the core as said arm is advanced radially, and automatic means for changing the angle of the roller with respect to its carrying arm and to the surface of the bead as the roller passes over the bead.

47. In a tire making machine the combination of a fabric and bead carrying rotary core, a fabric forming roller, an arm on which the bearing for said roller is movably mounted, means for advancing said arm radially of the core, a cam acting on said arm to cause the roller bearing to follow a path conforming to the contour of the work on the core as said arm is advanced radially, and automatic means for changing the angle of the roller with respect to its carrying arm and to the surface of the bead as the roller passes over the bead.

48. In a tire making machine the combination of a fabric and bead carrying rotary core, a fabric forming roller, means for advancing said roller radially of the core, a guide acting to cause the edge of the roller to follow automatically the contour of the fabric and bead on the core as said roller is advanced radially, and automatic means for changing the angle of the roller with respect to the surface of the bead as it passes over the bead.

49. A tire making machine comprising a core, a radially movable carriage, a shaping roller, means for positively moving said shaping roller bodily so as to cause it to conform to the contour of the work and additional automatic means to move the roller to change its angle with respect to the work, said two means acting concurrently during the advance of the roller.

50. In a tire making machine, a core, a radially movable arm, a spinning roller on the end of said arm, automatically operative means for positively moving the arm transversely of the core so as to cause the roller to follow the contour of the core and the contour of the bead.

51. In a tire making machine, a radially movable arm, a spinning roller on the end of said arm, a guiding surface and a guiding roller connected to said arm, the contour of the surface causing the spinning roller in its radial movement to follow the contour of the core, and a secondary formation in said guiding surface causing the spinning roller to follow the contour of the bead.

52. In a tire making machine, the combination of a revoluble core, a pivotally mounted arm, a spinning roller carried by the arm, means to advance the arm radially of the core, means to move the arm about its pivot to follow the contour of the core, and means to rock the arm to a greater extent and to simultaneously withdraw the spinning roller.

53. In a tire making machine, an arm, means for advancing the arm radially of the core, a spinning roller pivotally mounted on the end of said arm, a lever, means to operate said lever to move said roller about its pivot at the time the roller is stitching over the bead, and further means to move said roller more rapidly about its pivot when stitching under the bead.

54. In a tire making machine, an arm, means for advancing the arm radially of the core, a spinning roller on the end of said arm, means for changing the angle of the spinning roller as it reaches the bead, and automatically operative means for more rapidly changing its angle when it passes over the heel of the bead.

55. In a tire making machine, a trimming apparatus comprising a knife support, and a single means for moving said knife support radially to a position opposite the trimming point and laterally against the edge of the tire.

56. In a tire making machine, a trimming apparatus, comprising a knife support normally removed from the boundary of the tire, and a lever mechanism for moving said knife support within the boundary of the tire to a position opposite the trimming point, and laterally against the edge of the tire.

57. In a tire making machine, a trimming apparatus comprising a knife support and a knife thereon, means for moving said knife support whereby the knife is by a single operation moved radially and laterally to the trimming point at the edge of the tire.

58. In a tire making machine, a trimming apparatus comprising a slidable plate, a knife carrying arm pivoted on said plate, a knife in the end of said arm, means for moving said plate radially of the core, and means for rocking the arm on its pivot to bring the knife in contact with the core.

59. In a tire making machine, a trimming apparatus comprising a slidable plate, a knife carrying arm pivoted on said plate, a knife in the end of said arm, means for moving said plate radially of the core, a stop mechanism arranged to arrest the forward movement of the plate when the knife is opposite its trimming point, and means to rock said arm to bring the knife against the side of the core.

60. In a tire making machine, a trimming apparatus comprising a supporting member movable radially of the core, a knife carrying arm on said supporting member and movable thereon transversely of the core, a single means for moving said supporting member radially of the core, and said knife carrying member transversely thereof.

61. In a tire making machine, a trimming apparatus comprising a supporting member movable radially of the core, a knife carrying arm pivoted on said supporting member, means to move said supporting member radially of the core to project said knife carrying arm at the side of the core, and to rock the arm on its pivot to force the knife into contact with the core.

62. In a tire making machine, a trimming apparatus comprising a sliding plate, a pair of rocking arms pivoted on said plate, knives in the ends of said arms, means for moving the plate radially of the core, levers connected to said arms, means to move said plate, a stop to arrest the movement of said plate with the knives opposite their trimming positions, and means operable upon the end of movement of the sliding plate to operate said levers to rock the knives inwardly to the trimming point.

63. In a tire making machine, a trimming apparatus comprising a radially sliding plate, a pair of rocking arms pivoted on said plate, knives in the ends of said arms, a stop to arrest said plate in its radial movement with the knives opposite their trimming positions, a single operating means to move the plate radially and the arms pivotally at the end of the radial movement.

64. In a tire making machine, a movable plate, a pivoted knife carrying arm, a knife on the end of said arm, means to move said plate and said arm radially of the core until the knife is opposite its trimming point, and means to rock said arms to bring said knife into contact with the core.

65. In a tire making machine, a slidable plate, a rack on the underside of the plate, a pair of arms pivoted to said plate, a second rack, a pair of toggle links connecting said second rack with said pivoted arms, knives on the ends of said arms, a pinion adapted to mesh with the rack on the underside of the plate, and with the second named rack, means for stopping the forward movement of the plate, said second named rack being in mesh with the pinion when the plate is stopped.

66. A tire making machine comprising a rotary core support, a radially moving carriage, a spinning roller on said carriage, mechanism to advance said carriage from a position of rest to an operative position, a driving connection between said core support and said radially moving carriage, means to couple said support to said driving connections at the operative position, and a spring connected to said carriage in which energy is stored during the advance of said carriage to return it to a position of rest.

67. A tire making machine comprising a rotary core support, a radially moving carriage, a spinning roller on said carriage, mechanism to advance said carriage from a position of rest to an operative position, a driving connection between said core support and said radially moving carriage, means to couple said support to said driving connections at the operative position, a spring connected to said carriage in which energy is stored during the advance of said carriage to return it to a position of rest, and means to release said coupling means.

68. A stitching device for use on a tire making machine, comprising a pivoted arm, a spinning roller on the end of said arm, means to move said spinning roller in one direction, and means to return said spinning roller, the action of said returning means serving to rock said arm about its pivot so that the rollers will clear the core.

69. A stitching device for use on a tire making machine comprising a stitcher feeding element movable to and from the core, a pivoted stitcher carrying arm adjacent said element, a link connecting said arm and said element, a stop limiting the rocking movement of said link in one direction only of its movement but permitting the link to move freely in the other direction, whereby upon movement of the element away from the core the arm will be rocked about the pivot.

70. A stitching device for use on tire making machine, comprising a radially reciprocable slide, a pair of stitcher carrying arms pivoted adjacent the slide, a toggle connecting said slide and said arms, means to limit the movement of said toggle on the forward trip of said slide, but permitting the toggle to break on the backward movement whereby the arms are rocked about their pivots.

71. A stitching device for use on tire making machine comprising a radially reciprocable slide, pivoted arms adjacent the slide, means connecting said slide to said arms, said means in their forward movement maintaining said arms in one position and in their rearward movement rocking said arms about their pivots to separate their forward ends.

72. A stitching device for use in a tire machine, comprising a radially reciprocable slide, a pair of arms adjacent the slide, rollers on said arms, cam tracks on which said rollers move, stitchers on the arms, a toggle connecting said slide and said arms and means to maintain said toggle in one position on the forward movement of said slide, but to allow it to operate on the return movement thereof, whereby said arms are rocked about said rollers.

73. A stitching device for use in a tire machine comprising a radially reciprocable slide, a pair of arms adjacent the slide, stitchers on said arms, a toggle connecting said slide and said arms, means to maintain said toggle in one position on the forward movement of said slide, but to allow it to operate to spread said arms on the return movement.

74. A tire making machine comprising a movable support a core carried on said support, said support being arranged to come to a halt at two stations, a radially movable stitching roller at each said station, means to guide the roller at the first station to follow the contour of the core, and means to guide the roller at the second station to follow the contour of the core and the bead.

75. A tire making machine, comprising a movable support, a core carried on said support, said support being adapted to come to a halt at two positions, two radially moving spinning rollers adjacent the two said stations, a guiding formation for the spinning roller at the first station to cause it to follow the contour of the core and a second guiding formation for the second spinning roller to cause it to follow the contour of the core and the bead.

76. A tire making machine, comprising a movable support, a core carried on said support, said support being arranged to come to a halt at two stations, two sets of radially moving spinning rollers adjacent the two said stations, means at the first station for moving the spinning rollers laterally during their radial advance over the core to follow the contour of the core and means at the second station for moving the spinning rollers laterally during their radial advance over the core to follow the contour of the core and the bead.

77. A tire making machine, comprising a turntable, a plurality of core supports on said turntable, means for moving the turntable to bring the cores to two stations, a set of spinning rollers at the first station, radially movable and pivoted supports for the spinning rollers and means to move the spinning rollers about their pivots during their radial movement to cause them to follow the contour of the core, a second set of spinning rollers at the second station, radially movable and pivoted supports for the last named spinning rollers, and means to move the last named spinning rollers about their pivots during their radial movement to cause them to follow the contour of the core and the bead.

78. A tire making machine, comprising a turntable, a core support on the turntable, means to move the turntable to present the core to two stations, radially and laterally movable supports, adjacent the two stations, spinning rollers on the said supports, means to move the supports laterally during their radial movement so as to follow the contour of the work, the last named means at the second station being constructed to move the spinning rollers automatically to follow the contour of the bead.

79. A tire making machine, comprising a turntable, a core supporting and revolving device on said turntable, means to move the turntable to present the core to two stations, radially and laterally movable supports, adjacent the two stations, spinning rollers on the said supports, means to move the supports laterally during their radial movement so as to follow the contour of their work, the last named means at the second station being constructed to move the spinning rollers automatically to follow the contour of the bead and means to place beads on the tire between the two said stations.

80. A tire making machine comprising a turntable, a core supporting and revolving device on said turntable, a radially and laterally movable support adjacent the turntable, spinning rollers on the support, means to move the support radially to pass the spinning rollers over the surface of the core, a second radially and laterally movable support also adjacent the turntable, spinning rollers on the last named support and a guiding device adjacent the last named support to move it laterally to cause the rollers to follow the contour of the bead, and means to move the turntable to bring the core opposite the two said supports successively and a bead placing station between the two said supports.

81. A tire making machine comprising a core, a shiftable support for moving the core into two stations, a spinning roller at one station, means to move the spinning roller over the core, a second spinning roller at another station, means to move the second spinning roller over the core at the second station, and means at the second station to move the last named spinning roller laterally of the core to follow the contour of the bead.

82. A tire making machine comprising a core, a shiftable support for moving the core into three stations, a spinning roller at the first station, means to move the spinning roller over the core, a bead applying means at the second station, a spinning roller at the third station, means to move the spinning roller over the core at the third station and means to move the spinning roller laterally at the third station so that the working edge will follow the contour of the bead.

83. A tire making machine comprising a core, a shiftable support for moving the core into two stations, a radially and laterally movable spinning roller at the first said station, a cam formation, means connected with the spinning roller riding over the cam formation whereby the working edge of the roller follows the contour of the core, a radially and laterally movable spinning roller at the second station, a cam formation, means connected with the spinning roller riding over the cam formation whereby the working edge of the roller follows the contour of the core and the bead.

84. A tire making machine comprising a core, a shiftable support for moving the core into two stations, a radially and laterally movable spinning roller at the first said station, a cam formation, means connected with the spinning roller riding over the cam formation whereby the working edge of the roller follows the contour of the core, a radially and laterally movable spinning roller at the second station, a cam formation, means connected with the spinning roller riding over the cam formation whereby the working edge of the roller follows the contour of the core and the bead, and means to place beads on the core between the actions of the two said spinning rollers.

85. A tire making machine comprising a core, a shiftable support for moving the core into two stations, a radially and laterally movable arm at the first said station, a spinning roller having its bearing rigid with said arm, a radially and laterally movable arm at the second station, a spinning roller having its bearing pivotally supported on the second arm so as to be movable to change its angle with respect to the core and means cooperating with the second named spinning roller to move it about its pivot at the latter portion of the spinning operation.

86. A tire making machine comprising a core, a shiftable support for moving the core into two stations, a radially and laterally movable arm at the first said station, a spinning roller having its bearing rigid with said arm, a radially and laterally movable arm at the second station, a spinning roller having its bearing pivotally supported on said second arm so as to be movable to change its angle with respect to the core, and means to move the second spinning roller to change its angle when it encounters the bead of the tire, without stopping its radial advance.

87. A tire making machine comprising a core, a shiftable support for moving the core into two stations, a radially and laterally movable arm at the first station, a spinning roller having its bearing rigid with the said arm, a radially and laterally movable arm at the second station, a spinning roller on said arm, the last mentioned spinning roller being movable automatically to change its angle with respect to the core, and means to move both said arms laterally with respect to the core, to cause the spinning rollers to follow the contour of the work.

88. A tire making machine comprising a core, a shiftable support for moving the core into two stations, a radially and laterally movable arm at the first station, a spinning roller rigid with the said arm, a radially and laterally movable arm at the second station, a spinning roller on said arm movably supported on said second arm to change its angle with respect to the core, means to move the second spinning roller to change its angle when it encounters the bead of the tire, without stopping its radial advance and means to move both said arms laterally with respect to the core to cause the spinning rollers to follow the contour of the work.

89. A tire making machine comprising a core, a shiftable support for moving the core into two stations, a radially and laterally movable arm at the first station, a spinning roller having its bearing rigid with second arm, a radially and laterally movable arm at the second station, a spinning roller having its bearing pivotally supported on said second arm so as to be movable to change its angle with respect to the core, and means to place beads on the core between the two said spinning rollers.

90. A tire making machine comprising a core, a shiftable support for moving the core into two stations, a radially and laterally movable arm at the first said station, a spinning roller having its bearing rigid with said arm, a radially and laterally movable arm at the second station, a spinning roller having its bearing pivotally supported on its arm so as to be movable to change its angle with respect to the core, and means to move the second spinning roller to change its angle when it encounters the bead of the tire, without stopping its radial advance, and means to place beads on the core between the action of the two said spinning rollers.

91. A tire making machine comprising a core, a shiftable support for moving the core into two stations, a radially and laterally movable arm at the first station, a spinning roller having its bearing rigid with the said arm, a radially and laterally movable arm at the second station, a spinning roller having its bearing movably supported on the said arm to change its angle with respect to the core, and means to move both said arms laterally with respect to the core, to cause the spinning rollers to follow the contour of the work, and means to place beads on the core between the action of the two said spinning rollers.

92. A tire making machine comprising a core, a shiftable support for moving the core into two stations, a radially and laterally movable arm at the first station, a spinning roller having its bearing rigid with the said arm, a radially and laterally movable arm at the second station, a spinning roller having its bearing movably supported on its arm to change its angle with respect to the core, means to move the second spinning roller to change its angle when it encounter the bead of the tire without stopping its radial advance, and means to move both said arms laterally with respect to the core to cause the spinning rollers to follow the contour of the work, and means to place beads on the core between the action of the two said spinning rollers.

93. A tire making machine having, in combination. a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally disconnected therefrom, certain of said driving mechanisms having high and low speed drives; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric stretching and shaping mechanisms and a bead placing mechanism, which cooperate with the several cores on the chucks in succession, and such instrumentalities in their idle positions being remote from the cores so that they do not interfere either with the rotation of the cores or with their movement with the turntable as it rotates, there being fabric stretching and shaping mechanism at each station at which the high and low speed drives are located: a turntable governing mechanism which is under the control of a workman at one station only, said governing mechanism acting to unlock the turntable and then connect it to its driving mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric stretching and shaping station to control the high and low speed drive, and to bring into action the fabric shaping mechanism.

94. A tire making machine having, in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism; such driving clutch being normally in register but out of engagement with the correspondingly located driven clutch; tire making instrumentalities located at different stations about the turntable including fabric shaping mechanisms and a bead placing mechanism, which cooperate with the several cores on the chucks in succession, and such instrumentalities in their idle positions being remote from the cores so that they do not interfere either with the rotation of the cores or with their movement with the turntable as it rotates; a turntable governing mechanism which is under the control of a workman at one station only, said governing mechanism acting to unlock the turntable and then connect it to its driving mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

95. A tire making machine having, in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally ineffective; driving mechanism for the turntable which is normally ineffective; tire making instrumentalities located at different stations about the turntable including fabric shaping mechanisms and a bead placing mechanism, which cooperate with the several cores on the chucks in succession, and such instrumentalities in their idle positions being remote from the cores so that they do not interfere either with the rotation of the cores or with their movement with the turntable as it rotates; a turntable governing mechanism which is under the control of a workman at one station only, said governing mechanism acting to unlock the turntable and then render effective its driving mechanism, the turntable being automatically relocked when reaching the next advanced position; and its driving mechanism being automatically rendered ineffective; independent means under the control of a workman at each station by which he can control the rotation of the core which for the time being is opposite him; and means under the control of the workman at each fabric shaping station to bring into action the fabric shaping mechanism.

96. A tire making machine having, in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms, which cooperate with the several cores on the chucks is succession, and such instrumentalities in their idle positions being remote from the cores so that they do not interfere either with the rotation of the cores or with their movement with the turntable as it rotates; a turntable governing mechanism which is under the control of a workman at one station only, said governing mechanism acting to unlock the turntable and then connect it to its driving mechanism. the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

97. A tire making machine having, in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; a turntable governing mechanism which is under the control of a workman at one station only, said governing mechanism acting to unlock the turntable and then connect it to its driving mechanism, the turntable being automatically disconnected from its driving mechanism and relocked when reaching the next advanced position; and independent means under the control of a workman at each station by which he can engage the driving and driven clutches which control the rotation of the core which for the time being is opposite him.

98. A tire making machine having, in combination, a turntable; a plurality of core holding chucks carried by said turntable, a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms and a bead placing mechanism, which cooperate with the several cores on the chucks in succession, and such instrumentalities in their idle positions being remote from the cores so that they do not interfere either with the rotation of the cores or with their movement with the turntable as it rotates, a turntable governing mechanism which is under the control of a workman at one station only, said governing mechanism acting to unlock the turntable and then connect it to its driving mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

99. A tire making machine having, in combination, a turntable; a plurality of core holding chucks carried by said turntable, a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms, which cooperate with the several cores on the chucks in succession, and such instrumentalities in their idle positions being remote from the cores so that they do not interfere either with the rotation of the cores or with their movement with the turntable as it rotates; a turntable governing mechanism which is under the control of a workman at one station only, said governing mechanism acting to unlock the turntable and then connect it to its driving mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

100. A tire making machine having, in combination, a turntable; a plurality of core holding chucks carried by said turntable and movable thereby into a number of stations, each of said chucks being normally freely rotatable by hand; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms and a bead placing mechanism, which cooperate with the several cores on the chucks in succession, and such instrumentalities in their idle positions being remote from the cores so that they do not interfere either with the rotation of the cores or with their movement with the turntable as it rotates; a turntable governing mechanism which is under the control of a workman at one station only, said governing mechanism acting to connect it to its driving mechanism, the turntable being automatically disconnected from its driving mechanism when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

101. A tire making machine having, in combination, a turntable; a plurality of core holding chucks carried by said turntable and movable thereby into a number of stations, each of said chucks being normally freely rotatable by hand; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms, which cooperate with the several cores on the chucks in succession, and such instrumentalities in their idle positions being remote from the cores so that they do not interfere either with the rotation of the cores or with their movement with the turntable as it rotates; a turntable governing mechanism which is under the control of a workman at one station only, said governing mechanism acting to connect it to its driving mechanism, the turntable being automatically disconnected from its driving mechanism when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

102. A tire making machine having, in combination, a turntable; a plurality of core holding chucks carried by said turntable and movable thereby into a number of stations, each of said chucks being normally freely rotatable by hand; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms and a bead placing mechanism, which cooperate with the several cores on the chucks in succession, and such instrumentalities in their idle positions being remote from the cores so that they do not interfere either with the rotation of the cores or with their movement with the turntable as it rotates; a turntable governing mechanism acting to unlock the turntable and then connect it to its driving mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

103. A tire making machine having, in combination, a turntable; a plurality of core holding chucks carried by said turntable and movable thereby into a number of stations, each of said chucks being normally freely rotatable by hand; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms, which cooperate with the several cores on the chucks in succession, and such instrumentalities in their idle positions being remote from the cores so that they do not interfere either with the rotation of the cores or with their movement with the turntable as it rotates; a turntable governing mechanism acting to unlock the turntable and then connect it to its driving mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

104. A tire making machine having, in combination, a turntable; a plurality of core holding chucks carried by said turntable and movable thereby into a number of stations; independent driving mechanisms equal in number to the core chucks and normally disconnected therefrom; driving mechanism for the turntable which is normally disconnected therefrom; a driven clutch operatively connected with each core chuck; a driving clutch operatvely connected with each driving mechanism, such driving clutch being normally in register but out of engagement with the correspondingly located driven clutch; tire making instrumentalities located at different stations about the turntable including fabric shaping mechanisms and a bead placing mechanism, which cooperate with the several cores on the chucks in succession, and such instrumentalities in their idle positions being remote from the cores so that they do not interfere either with the rotation of the cores or with their movement with the turntable as it rotates; a turntable governing mechanism acting to connect it to its driving mechanism, the turntable being automatically disconnected from its driving mechanism when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

105. A tire making machine having in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms and a bead placing mechanism, which cooperate with the several cores on the chucks in succession; a turntable governing mechanism which is under the control of a workman at one station only, said governing mechanism acting to unlock the turntable and then connect it to its driving mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

106. A tire making machine having; in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms, which cooperate with the several cores on the chucks in succession; a turntable governing mechanism which is under the control of a workman at one station only, said governing mechanism acting to unlock the turntable and then connect it to its driving mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

107. A tire making machine having, in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally disconnected therefrom; driving mechanism for the urntable which is normally disconnected therefrom; a driven clutch operatively connected with each core chuck; a driving clutch operatively connected with each driving mechanism; such driving clutch being normally in register but out of engagement with the correspondingly located driven clutch; tire making instrumentalities located at different stations about the turntable including fabric shaping mechanisms and a bead placing mechanism, which cooperate with the several cores on the chucks in succession; a turntable governing mechanism acting to unlock the turntable and then connect it to its driying mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

108. A tire making machine having, in combination, a turntable; a plurality of core holding chucks carried by said turntable; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms and a bead placing mechanism, which cooperate with the several cores on the chucks in succession; a turntable governing mechanism acting to unlock the turntable and then connect it to its driving mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

109. A tire making machine having, in combination, a turntable; a plurality of core holding chucks carried by said turntable; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms, which cooperate with the several cores on the chucks in succession; a turntable governing mechanism acting to unlock the turntable and then connected to its driving mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means under the control of the workman at each fabric shaping station to bring into action the fabric shaping mechanism.

110. A tire making machine having, in combination, a turntable; a plurality of core holding chucks carried by said turntable; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; tire making instrumentalities located at different stations about the turntable including fabric shaping mechanisms and a bead placing mechanism, which cooperate with the several cores on the chucks in succession; a turntable governing mechanism acting to unlock the turntable and then connect it to its driving mechanism, the turntable being automatically disconnected from its driving mechanism and relocked when reaching the next advanced position; independent means under the control of a workman at each station by which he can engage the driving and driven clutches which control the rotation of the core which for the time being is opposite him; and means at each fabric shaping station to bring into action the fabric shaping mechanism.

111. A tire making machine having, in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally ineffective; driving mechanism for the turntable which is normally ineffective; tire making instrumentalities located at different stations about the turntable including fabric shaping mechanisms and a bead placing mechanism, which cooperate with the several cores on the chucks in succession, and such instrumentalities in their idle positions being remote from the cores so that they do not interfere either with the rotation of the cores or with their movement with the turntable as it rotates; a turntable governing mechanism which is under the control of a workman at one station only, said governing mechanism acting to unlock the turntable and then render effective its driving mechanism, the turntable being automatically re- locked when reaching the next advanced position, and its driving mechanism being automatically rendered ineffective; independent means under the control of a workman at each station by which he can control the rotation of the core which for the time being is opposite him; and means at each fabric shaping station to bring into action the fabric shaping mechanism.

112. A tire making machine having, in combination, a turntable; a plurality of core holding chucks carried by said turntable and movable thereby into a number of stations, each of said chucks being normally freely rotatable by hand; independent driving mechanisms equal in number to the core chucks and normally ineffective; driving mechanism for the turntable which is normally ineffective; tire making instrumentalities located at different stations about the turntable including fabric shaping mechanisms, which cooperate with the several cores on the chucks in succession, and such instrumentalities in their idle positions being remote from the cores so that they do not interfere either with the rotation of the cores or with their movement with the turntable as it rotates; a turntable governing mechanism which is under the control of a workman at one station only, said governing mechanism acting to render effective its driving mechanism, the driving mechanism for the turntable being rendered ineffective when it reaches the next advanced position; independent means under the control of a workman at each station by which he can control the rotation of the core which for the time being is opposite him; and means under the control of the workman at each fabric shaping station to bring into action the fabric shaping mechanism.

113. A tire making machine having, in combination, a turntable; a plurality of core holding chucks carried by said turntable and movable thereby into a number of stations, each of said chucks being normally freely rotatable by hand; independent driving mechanisms equal in number to the core chucks and normally ineffective; driving mechanism for the turntable which is normally ineffective; tire making instrumentalities located at different stations about the turntable including fabric shaping mechanisms and a bead placing mechanism, which cooperate with the several cores on the chucks in succession, and such instrumentalities in their idle positions being remote from the cores so that they do not interfere either with the rotation of the cores or with their movement with the turntable as it rotates; a turntable governing mechanism which is under the control of a workman at one station only, said governing mechanism acting to render effective its driving mechanism, the driving mechanism for the turntable being automatically rendered ineffective when it reaches the next advanced position; independent means under the control of a workman at each station by which he can control the rotation of the core which for the time being is opposite him; and means under the control of the workman at each fabric shaping station to bring into action the fabric shaping mechanism.

114. A tire making machine having, in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally ineffective; driving mechanism for the turntable which is normally ineffective; tire making instrumentalities located at different stations about the turntable including fabric shaping mechanisms and a bead placing mechanism, which cooperates with the several cores on the chucks in succession, and such instrumentalities in their idle positions being remote from the cores so that they do not interfere either with the rotation of the cores or with their movement with the turntable as it rotates; a turntable governing mechanism acting to unlock the turntable and render effective its driving mechanism, the turntable being automatically relocked when reaching the next advanced position, and its driving mechanism being automatically rendered ineffective; independent means under the control of a workman at each station by which he can control the rotation of the core which for the time being is opposite him; and means under the control of the workman at each fabric shaping station to bring into action the fabric shaping mechanism.

115. A tire making machine having, in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally ineffective; driving mechanism for the turntable which is normally ineffective; tire making instrumentalities located at different stations about the turntable including fabric shaping mechanisms, which cooperate with the several cores on the chucks in succession, and such instrumentalities in their idle positions being remote from the cores so that they do not interfere either with the rotation of the cores or with their movement with the turntable as it rotates; a turntable governing mechanism acting to unlock the turntable and then render effective its driving mechanism, the turntable being automatically relocked when reaching the next advanced position, and its driving mechanism being automatically rendered ineffective; independent means under the control of a workman at each station by which he can control the rotation of the core which for the time being is opposite him; and means under the control of the workmen at each fabric shaping station to bring into action the fabric shaping mechanism.

116. A tire making machine having, in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally ineffective; driving mechanism for the turntable which is normally ineffective; tire making instrumentalities located at different stations about the turntable including fabric shaping mechanisms, which cooperate with the several cores on the chucks in succession, such instrumentalities in their idle positions being remote from the cores so that they do not interfere either with the rotation of the cores or with their movement with the turntable as it rotates; a turntable governing mechanism which is under the control of a workman at one station only, said governing mechanism acting to unlock the turntable and then render effective its driving mechanism, the turntable being automatically relocked when reaching the next advanced position, and its driving mechanism being automatically rendered ineffective; independent means under the control of a workman at each station by which he can control the rotation of the core which for the time being is opposite him; and means under the control of the workman at each fabric shaping station to bring into action the fabric shaping mechanism.

117. A tire making machine having, in combination, a turntable; a plurality of core holding chucks carried by said turntable; a lock which holds said turntable in a definite normal position of rest at the several working stations; independent driving mechanisms equal in number to the core chucks and normally ineffective; driving mechanism for the turntable which is normally ineffective; tire making instrumentalities located at different stations about the turntable including fabric shaping mechanisms and a bead placing mechanism, which cooperate with the several cores on the chucks in succession, and such instrumentalities in their idle positions being remote from the cores so that they do not interfere either with the rotation of the cores or with their movement with the turntable as it rotates; a turntable governing mechanism acting to unlock the turntable and then render effective its driving mechanism, the turntable being automatically relocked when reaching the next advanced position, and its driving mechanism being automatically rendered ineffective; independent means under the control of a workman at each station by which he can control the rotation of the core which for the time being is opposite him; and means at each fabric shaping station to bring into action the fabric shaping mechanism.

118. A tire making machine having, in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally ineffective; driving mechanism for the turntable which is normally ineffective; tire making instrumentalities located at different stations about the turntable including fabric shaping mechanisms and a bead placing mechanism, which cooperates with the several cores on the chucks in succession; a turntable governing mechanism which is under the control of a workman at one station only, said governing mechanism acting to unlock the turntable and then render effective its driving mechanism, the turntable being automatically relocked when reaching the next advanced position, and its driving mechanism being automatically rendered ineffective; independent means under the control of a workman at each station by which he can control the rotation of the core which for the time being is opposite him; and means under the control of the workman at each fabric shaping station to bring into action the fabric shaping mechanism.

119. A tire making machine having, in combination, a turntable; a plurality of core holding chucks carried by said turntable, each of said chucks being normally freely rotatable by hand; a lock which holds said turntable in a definite normal position of rest at the several working stations; independent driving mechanisms equal in number to the core chucks and normally ineffective; driving mechanism for the turntable which is normally ineffective; tire making instrumentalities located at different stations about the turntable including fabric shaping mechanisms and a bead placing mechanism, which cooperate with the several cores on the chucks in succession; a turntable governing mechanism which is under the control of a workman at one station only, said governing mechanism acting to unlock the turntable and then render effective its driving mechanism, the turntable being automatically relocked when reaching the next advanced position, and its driving mechanism being automatically rendered ineffective; independent means under the control of a workman at each station by which he can control the rotation of the core which for the time being is opposite him; and means at each fabric shaping station to bring into action the fabric shaping mechanism.

120. A tire making machine having, in combination, a turntable; a plurality of core holding chucks carried by said turntable; a lock which holds said turntable in a definite normal position of rest at the several working stations; independent driving mechanisms equal in number to the core chucks and normally ineffective; driving mechanism for the turntable which is normally ineffective; tire making instrumentalities located at different stations about the turntable including fabric shaping mechanisms and a bead placing mechanism, which cooperate with the several cores on the chucks in succession; a turntable governing mechanism acting to unlock the turntable and then render effective its driving mechanism, the turntable being automatically relocked when reaching the next advanced position, and its driving mechanism being automatically rendered ineffective; independent means under the control of a workman at each station by which he can control the rotation of the core which for the time being is opposite him; and means at each fabric shaping station to bring into action the fabric shaping mechanism.

121. A tire making machine having, in combination, a turntable; a plurality of core holding chucks carried by said turntable; independent driving mechanisms equal in number to the core chucks and normally ineffective; driving mechanism for the turntable which is normally ineffective; tire making instrumentalities located at different stations about the turntable including fabric shaping mechanisms, which cooperate with the several cores on the chucks in succession, such instrumentalities in their idle positions being remote from the cores so that they do not interfere either with the rotation of the cores or with their movement with the turntable as it rotates; a turntable governing mechanism acting to render effective its driving mechanism, the driving mechanism for the turntable being rendered ineffective when reaching the next advanced position; independent means at each station to control the rotation of the core at that station; and means at each fabric shaping station to bring into action the fabric shaping mechanism.

122. A tire making machine having, in combination, a turntable; a plurality of core holding chucks carried by said turntable; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; a turntable governing mechanism acting to unlock the turntable and then connect it to its driving mechanism, the turntable being automatically disconnected from its driving mechanism and relocked when reaching the next advanced position; and independent means under the control of a workman at each station by which he can engage the driving and driven clutches which control the rotation of the core which for the time being is opposite him.

123. A tire making machine having, in combination, a turntable; a plurality of core holding chucks carried by said turntable; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; a turntable governing mechanism which is under the control of a workman at one station only, said governing mechanism acting to unlock the turntable and then connect it to its driving mechanism, the turntable being disconnected from its driving mechanism and relocked when reaching the next advanced position; and independent means to engage the driving and driven clutches.

124. A tire making machine having, in combination, a turntable; a plurality of core holding chucks carried by said turntable; a lock which holds said turntable in a definite normal position of rest at the several working stations; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; a turntable governing mechanism which is under the control of a workman at one station only, said governing mechanism acting to unlock the turntable and then connect it to its driving mechanism, the turntable being automatically disconnected from its driving mechanism and relocked when reaching the next advanced position; and independent means at each station for engaging the driving and driven clutches which control the rotation of the core.

125. A tire making machine having, in combination, a turntable; a plurality of core holding chucks carried by said turntable, each of said chucks being normally freely rotatable by hand; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; a turntable governing mechanism which is under the control of a workman at one station only, acting to unlock the turntable and then connect it to its driving mechanism, the turntable being automatically disconnected from its driving mechanism when reaching the next advanced position; and independent means under the control of a workman at each station by which he can engage the driving and driven clutches which control the rotation of the core which for the time being is opposite him.

126. A tire making machine having, in combination, a turntable; a plurality of core holding chucks carried by said turntable; independent driving mechanism equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; a turntable governing mechanism which is under the control of a workman at one station only, acting to connect it to its driving mechanism, the turntable being automatically disconnected from its driving mechanism when reaching the next advanced position; and independent means under the control of a workman at each station by which he can engage the driving and driven clutches which control the rotation of the core which for the time being is opposite him.

127. A tire making machine having, in combination, a turntable; a plurality of core holding chucks carried by said turntable; independent driving mechanisms equal in number to the core chucks and normally disconnected therefrom; driving mechanism for the turntable which is normally disconnected therefrom; a driven clutch operatively connected with each core chuck; a driving clutch operatively connected with each driving mechanism, such driving clutch being normally in register but out of engagement with the correspondingly located driven clutch; a turntable governing mechanism acting to connect it to its driving mechanism, the turntable being automatically disconnected from its driving mechanism when reaching the next advanced position; and independent means for engaging the driving and driven clutches which control the rotation of the cores.

128. A tire making machine having, in combination, a fabric and bead carrying rotatable core; an arm moving radially with respect to said core; a spinning roller and its bearing pivotally mounted on said arm; a lever pivotally mounted on said arm; a link connecting said lever and bearing; and two pins in the path of said lever located at different distances from the lever pivot, and at different distances along the path of the lever, the pin last encountered being the one nearer the lever pivot, whereby, when the spinning roller passes over the bead, its angle to the core is changed, at first slowly as the said lever bears against the pin first reached, and then rapidly as said lever bears against the pin last reached.

129. A tire making machine having, in combination, a fabric and bead carrying rotatable core; an arm moving radially with respect to said core; a spinning roller and its bearing pivotally mounted on said arm; a lever pivotally mounted on said arm; a link connecting said lever and bearing; and means in the path of said lever presenting surfaces located at different distances from the lever pivot, and at different distances along the path of the lever, the surface last encountered being the one nearer the lever pivot, whereby, when the spinning roller passes over the bead, its angle to the core is changed, at first slowly as the said lever bears against the surface first reached, and then rapidly as said lever bears against the surface last reached.

130. Fabric shaping mechanism for tire forming machines comprising a plate movable toward and from the core, pivoted arms movable with the plate, fabric shaping rollers carried by said arms and pivotally mounted thereon to change their angular position with respect to the core, levers connected to the shaping rollers and pins within the path of the levers to operate them whereby the rollers are moved pivotally.

131. Fabric shaping mechanism for tire forming machines comprising a plate movable toward and from the core, a guiding cam way adjacent the plate, a roller movable in the cam way, an arm carrying said roller and pivoted to the plate, a fabric shaping roller carried by said arm and pivotally mounted thereon so as to be capable of movement to vary its angular position with respect to the core, a lever connected to the shaping roller, and pins within the path of the lever to operate it whereby the shaping roller is moved pivotally as described.

132. Fabric shaping mechanism for tire forming machines, comprising a rack movable toward and from the core, releasable driving connections for the rack, guiding cams at either side of the rack, rollers movable over the cams, swingable arms on which the rollers are carried, fabric shaping rollers carried by the arms and pivotally mounted thereon so as to be capable of movement to vary their angular position with respect to the core, levers connected to the rollers, pins within the path of the levers to actuate them whereby the rollers are pivotally moved as described, and means for releasing the driving connection for the rack after the rollers have moved pivotally.

WILLIAM C. STEVENS.